United States Patent
Kono et al.

(10) Patent No.: US 8,811,698 B2
(45) Date of Patent: *Aug. 19, 2014

(54) IMAGE PROCESSING APPARATUS, IMAGE PROCESSING METHOD, AND COMPUTER-READABLE RECORDING MEDIUM

(75) Inventors: Takashi Kono, Tachikawa (JP); Yamato Kanda, Hino (JP); Makoto Kitamura, Hachioji (JP); Takehiro Matsuda, Hachioji (JP); Masashi Hirota, Hachioji (JP)

(73) Assignee: Olympus Corporation, Tokyo (JP)

(*) Notice: Subject to any disclaimer, the term of this patent is extended or adjusted under 35 U.S.C. 154(b) by 13 days.

This patent is subject to a terminal disclaimer.

(21) Appl. No.: 13/095,157

(22) Filed: Apr. 27, 2011

(65) Prior Publication Data

US 2011/0274321 A1    Nov. 10, 2011

(30) Foreign Application Priority Data

Apr. 30, 2010 (JP) ................................. 2010-105755

(51) Int. Cl.
*G06K 9/00* (2006.01)
*G06T 7/40* (2006.01)
*G06T 7/00* (2006.01)

(52) U.S. Cl.
CPC ..... *G06T 7/0012* (2013.01); *G06T 2207/20021* (2013.01); *G06T 7/403* (2013.01); *G06T 7/0083* (2013.01)
USPC ........... 382/128; 382/103; 382/160; 382/167; 382/131; 382/199

(58) Field of Classification Search
CPC ... G06T 7/0012; G06T 7/0079; G06T 7/0085; G06T 2207/30004; G06T 2207/30096; G06K 2209/05

USPC .......... 382/128, 103, 160, 167, 131, 199, 165
See application file for complete search history.

(56) References Cited

U.S. PATENT DOCUMENTS 5,487,116 A * 1/1996 Nakano et al. ................ 382/104
6,173,083 B1 * 1/2001 Avinash ........................ 382/260
(Continued)

FOREIGN PATENT DOCUMENTS

JP    9-106448 A    4/1997
JP    2002-099896    4/2002
(Continued)

OTHER PUBLICATIONS

A F Fercher, W Drexler, C K Hitzenberger and T Lasser,; "Optical coherence tomography—principles andapplications", Institute of Medical Physics, Jan. 20, 2003.*

(Continued)

*Primary Examiner* — Stephen R Koziol
*Assistant Examiner* — Shaghayegh Azima
(74) *Attorney, Agent, or Firm* — Scully, Scott, Murphy & Presser, P.C.

(57) ABSTRACT

An image processing apparatus includes: a gradient information calculating unit that calculates gradient information of each of pixels, based on pixel values of an intraluminal image; a closed region creating unit that, based on the gradient information, creates a closed region satisfying a condition where the closed region does not include, on the inside thereof, any pixel of which the gradient strength is equal to or higher than a predetermined value, and also, the boundary of the closed region does not curve toward the interior of the closed region, with a curvature equal to or larger than a predetermined value; and an abnormal part detecting unit that detects an abnormal part from the inside of the closed region.

16 Claims, 18 Drawing Sheets

(56) References Cited

U.S. PATENT DOCUMENTS

| | | | | |
|---|---|---|---|---|
| 6,272,233 | B1* | 8/2001 | Takeo | 382/128 |
| 6,728,401 | B1* | 4/2004 | Hardeberg | 382/167 |
| 2002/0062061 | A1* | 5/2002 | Kaneko et al. | 600/118 |
| 2002/0063893 | A1* | 5/2002 | Fujieda | 358/1.15 |
| 2003/0036751 | A1* | 2/2003 | Anderson et al. | 606/9 |
| 2003/0139650 | A1* | 7/2003 | Homma | 600/181 |
| 2005/0129296 | A1* | 6/2005 | Setala | 382/131 |
| 2007/0230767 | A1* | 10/2007 | Iwamatsu et al. | 382/133 |
| 2007/0260214 | A1* | 11/2007 | Mikkaichi et al. | 604/500 |
| 2008/0040083 | A1* | 2/2008 | Odry et al. | 703/2 |
| 2008/0100612 | A1* | 5/2008 | Dastmalchi et al. | 345/418 |
| 2008/0240526 | A1* | 10/2008 | Suri et al. | 382/128 |
| 2008/0267468 | A1* | 10/2008 | Geiger et al. | 382/128 |
| 2009/0196476 | A1* | 8/2009 | Inoue | 382/128 |
| 2009/0202124 | A1* | 8/2009 | Matsuda et al. | 382/128 |
| 2009/0252395 | A1* | 10/2009 | Chan et al. | 382/131 |
| 2010/0067742 | A1* | 3/2010 | Ogawa | 382/128 |
| 2010/0092055 | A1* | 4/2010 | Matsuda | 382/128 |
| 2010/0134517 | A1* | 6/2010 | Saikaly et al. | 345/619 |
| 2010/0172554 | A1* | 7/2010 | Kassab et al. | 382/128 |
| 2010/0177957 | A1* | 7/2010 | Ogawa | 382/160 |
| 2010/0269064 | A1* | 10/2010 | Lobregt et al. | 715/810 |
| 2011/0002522 | A1* | 1/2011 | Goto et al. | 382/131 |
| 2011/0019886 | A1* | 1/2011 | Mizuno | 382/128 |
| 2011/0116606 | A1* | 5/2011 | Yankelevitz et al. | 378/207 |
| 2011/0158474 | A1* | 6/2011 | Srikrishnan et al. | 382/103 |
| 2011/0176730 | A1* | 7/2011 | Sasaki | 382/167 |
| 2011/0181614 | A1* | 7/2011 | Chang et al. | 345/595 |
| 2012/0051612 | A1* | 3/2012 | Kitamura et al. | 382/128 |
| 2012/0051654 | A1* | 3/2012 | Kitamura et al. | 382/199 |

FOREIGN PATENT DOCUMENTS

| | | |
|---|---|---|
| JP | 2002-165757 A | 6/2002 |
| JP | 2007-244519 A | 9/2007 |
| WO | 2008/136098 A1 | 11/2008 |

OTHER PUBLICATIONS

A F Fercher, W Drexler, C K Hitzenberger and T Lasser,; "Optical coherence tomography-principles andapplications", Institute of Medical Physics, Jan. 20, 2003.*

Jin, H. and Kobatake, H. The Transitions of the Institute of Electronics, Information and Communication Engineers, 'Extraction of Microcalcifications on Mammogram Using Morphological Filter with Multiple Structuring Elements', Jul. 1992, D-II, vol. J75-D-II, No. 7, pp. 1170-1176 with English language abstract.

Kobatake, H. Medical Imaging Technology, 'Basic Theory of Mathematical Morphology and its Application to Mammogram Processing', Jan. 1994, vol. 12, No. 1, pp. 59-66, with English language abstract.

Gonzalez, R., "Digital Image Processing", Second Edition, 1987, pp. 160-161 and 336-337.

http://en.wikipedia.org/wiki/Gaussian_blur, "Gaussian blur" printed Oct. 24, 2013.

http://www.merriam-webster.com/dictionary/prostate+gland, "prostate gland" printed Oct. 25, 2013.

Notice of Rejection dated Mar. 11, 2014 from related Japanese Application No. 2010-105755, together with an English language translation.

* cited by examiner

FIG.18
(a)
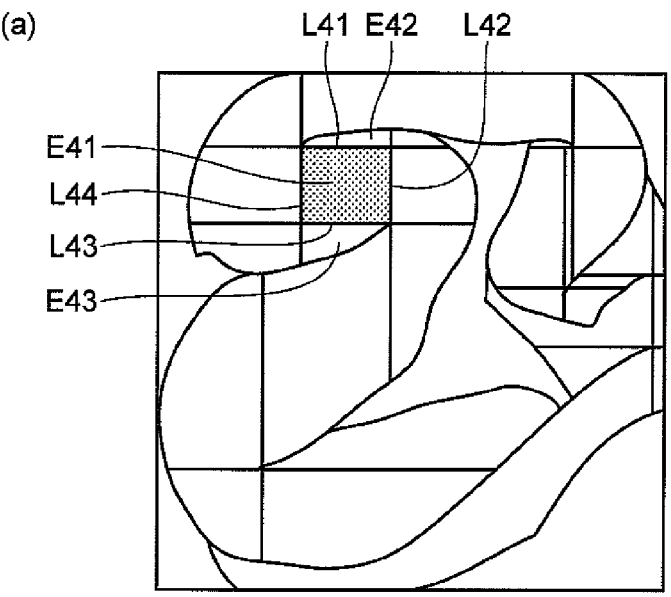
(b)
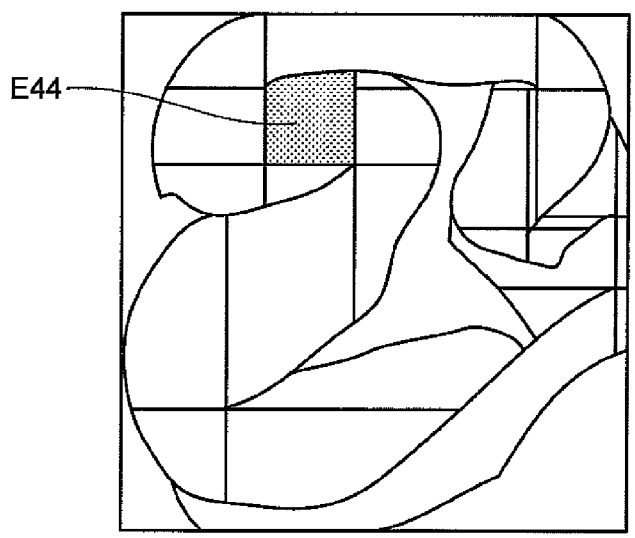

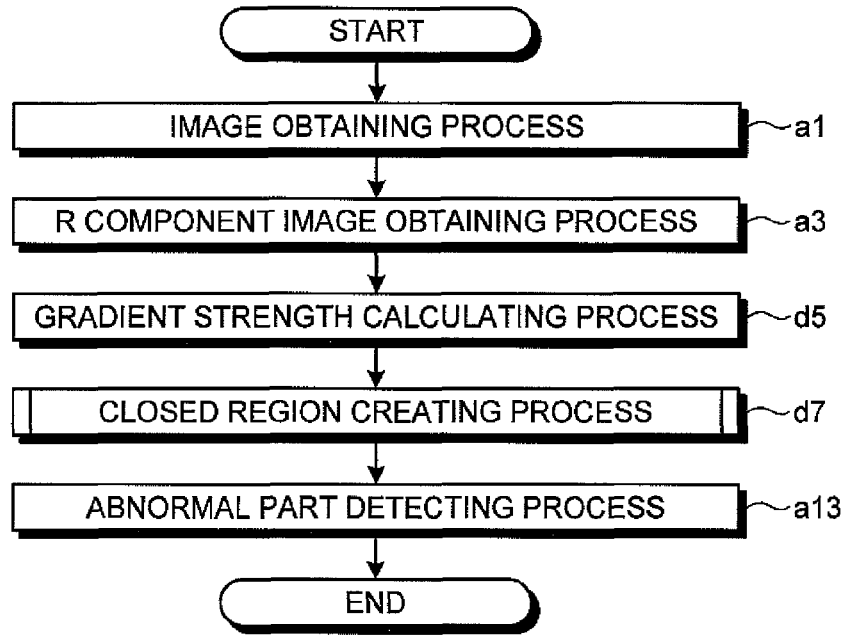
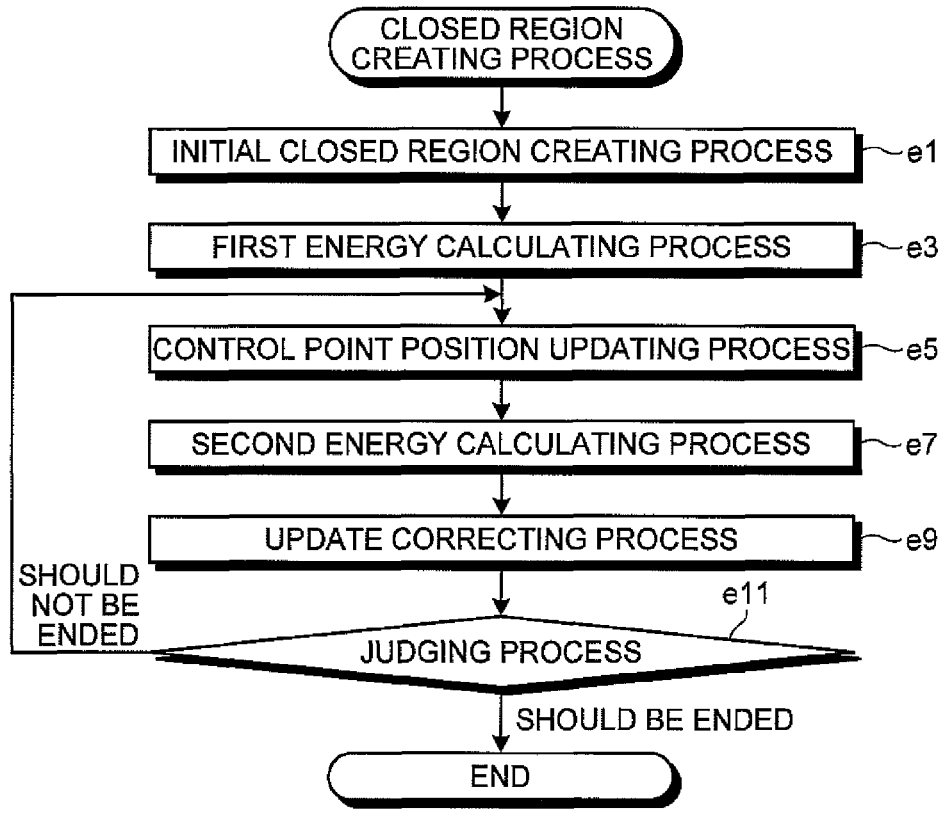

IMAGE PROCESSING APPARATUS, IMAGE PROCESSING METHOD, AND COMPUTER-READABLE RECORDING MEDIUM

CROSS-REFERENCE TO RELATED APPLICATIONS

This application is based upon and claims the benefit of priority from Japanese Patent Application No. 2010-105755, filed on Apr. 30, 2010, the entire contents of which are incorporated herein by reference.

BACKGROUND OF THE INVENTION

1. Field of the Invention

The present invention relates to an image processing apparatus, an image processing method, and an image processing program for processing an intraluminal image capturing an image of the inside of a lumen.

2. Description of the Related Art

Conventionally, endoscopes are popularly used as a medical observation apparatus introduced into the body of an examined subject such as a patient, to observe the inside of a lumen in the body. Also, in recent years, swallowed endoscopes (capsule endoscopes) have been developed that include, within a capsule-shaped casing, an image capturing device and a communication device that wirelessly transmits image data captured by the image capturing device to the outside of the body of the subject. It requires much experience to observe an image of the inside of the lumen in the subject's body (an intraluminal image) captured by such a medical observation apparatus and to make a diagnosis. Thus, medical diagnosis aiding functions that support medical doctors making a diagnosis are in demand. As an image recognition technique to realize such a function, a technique has been proposed by which an abnormal part such as a lesion is automatically detected from an intraluminal image and presented to a medical doctor or the like.

For example, Japanese Laid-open Patent Publication No. 2002-99896 discloses a technique by which candidates for microcalcification shadows, which serve as one of characteristics of a cancerized portion of breast cancer, are detected in a stable manner without being affected by macrostructures and linear-structures, while using shape-dependent filters. In this publication, based on a presumed shape of a microcalcification shadow, a second shape-dependent filter is prepared in advance by optimizing the filtering characteristic thereof according to various conditions such as an image-capturing condition, a reading condition, an image contrast, and a size of a microcalcification shadow, as well as conditions obtained by combining any of these conditions. First, a microstructure image showing a microstructure part is generated by eliminating straight-line structures from an image while using a first shape-dependent filter, which is a morphology filter (see, for example, KOBATAKE et al., "Extraction of Microcalcifications on Mammogram Using Morphological Filter with Multiple Structuring Elements", The Transactions of the Institute of Electronics, Information and Communication Engineers, D-II, Vol. J75-D-II, No. 7, pages 1170-1176, July 1992; and KOBATAKE et al., "Basic Theory of Mathematical Morphology and its Application to Mammogram Processing", MEDICAL IMAGING TECHNOLOGY, Vol. 12, No. 1, January 1994). After that, by applying an emphasizing process to the microstructure image while using the prepared second shape-dependent filter, an emphasized image is generated in which only candidates for microcalcification shadows are emphasized relative to the surrounding thereof (i.e., the parts that are other than the candidates for microcalcification shadows and that include macrostructure parts, and linear structure parts, and the like that were not eliminated by the first shape-dependent filter).

SUMMARY OF THE INVENTION

An image processing apparatus according to the present invention that detects an abnormal part from an intraluminal image includes: a gradient information calculating unit that calculates gradient information of each of pixels, based on pixel values of the intraluminal image; a closed region creating unit that, based on the gradient information, creates a closed region satisfying a condition where the closed region does not include, on an inside thereof, any pixel of which a gradient strength is equal to or higher than a predetermined value, and also, a boundary of the closed region does not curve toward an interior of the closed region, with a curvature equal to or larger than a predetermined value; and an abnormal part detecting unit that detects the abnormal part from the inside of the closed region.

An image processing method according to the present invention for detecting an abnormal part from an intraluminal image includes: calculating gradient information of each of pixels, based on pixel values of the intraluminal image; creating, based on the gradient information, a closed region satisfying a condition where the closed region does not include, on an inside thereof, any pixel of which a gradient strength is equal to or higher than a predetermined value, and also, a boundary of the closed region does not curve toward an interior of the closed region with a curvature equal to or larger than a predetermined value; and detecting the abnormal part from the inside of the closed region.

A non-transitory computer-readable recording medium according to the present invention stores thereon an executable program, wherein the program instructs a processor to perform: calculating gradient information of each of pixels, based on pixel values of the intraluminal image; creating, based on the gradient information, a closed region satisfying a condition where the closed region does not include, on an inside thereof, any pixel of which a gradient strength is equal to or higher than a predetermined value, and also, a boundary of the closed region does not curve toward an interior of the closed region with a curvature equal to or larger than a predetermined value; and detecting the abnormal part from the inside of the closed region.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a drawing of a closed region that includes, on the inside thereof, an edge representing a groove position or the like;

FIG. 7 is a drawing of a closed region that includes, on the boundary thereof, an edge that curves significantly representing a contour portion or the like;

Figures 12A, 12B, 12C, 12D, 12E, 12F, 12G, 12H:
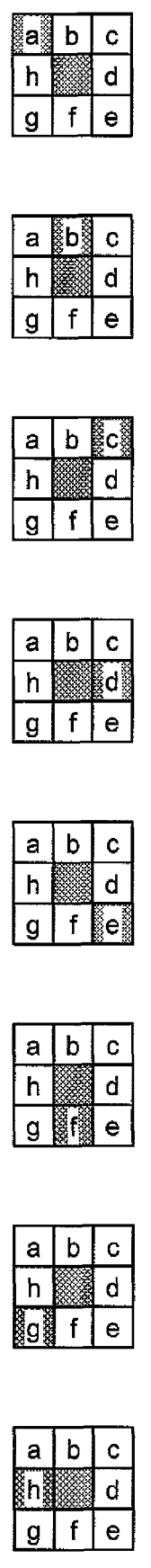

FIG. 12A is a drawing of a base point pattern;
FIG. 12B is a drawing of another base point pattern;
FIG. 12C is a drawing of yet another base point pattern;
FIG. 12D is a drawing of yet another base point pattern;
FIG. 12E is a drawing of yet another base point pattern;
FIG. 12F is a drawing of yet another base point pattern;
FIG. 12G is a drawing of yet another base point pattern;
FIG. 12H is a drawing of yet another base point pattern;
FIG. 13A is a drawing of yet another base point pattern;
FIG. 13B is a drawing of yet another base point pattern;
FIG. 13C is a drawing of yet another base point pattern;
FIG. 13D is a drawing of yet another base point pattern;
FIG. 13E is a drawing of yet another base point pattern;
FIG. 13F is a drawing of yet another base point pattern;
FIG. 13G is a drawing of yet another base point pattern;
FIG. 13H is a drawing of yet another base point pattern;

FIG. 18 is a drawing explaining a principle for integrating regions;

FIG. 23 is an overall flowchart of a processing procedure performed by the image processing apparatus according to the second embodiment;

FIG. 24 is a flowchart of a detailed processing procedure in a closed region creating process according to the second embodiment;

DETAILED DESCRIPTION OF THE PREFERRED EMBODIMENTS

Figure 1:
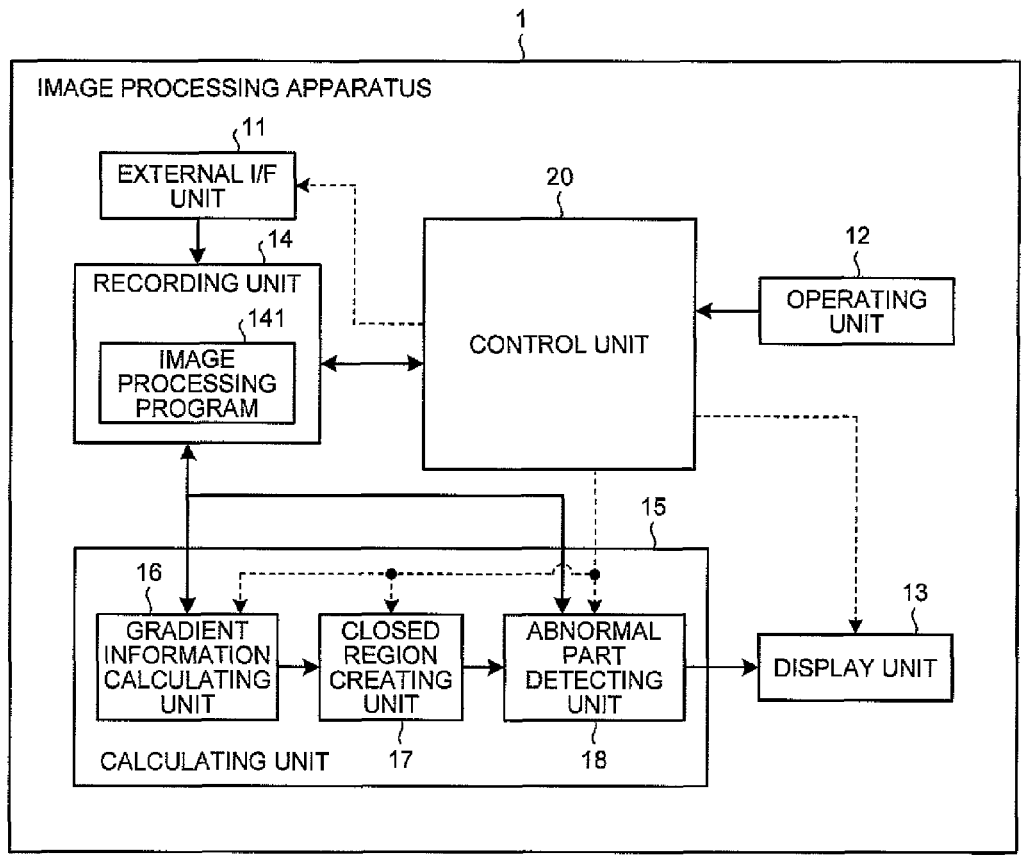
FIG. 1 is a block diagram explaining an exemplary functional configuration of an image processing apparatus according to a first embodiment of the present invention.

In the following sections, exemplary embodiments of the present invention will be explained, with reference to the accompanying drawings. The present invention is not limited by the exemplary embodiments. In the drawings, the same elements are referred to by using the same reference symbols.

An image processing apparatus according to an aspect of the exemplary embodiments processes an image (an intraluminal image) obtained by a medical observation apparatus such as an endoscope or a capsule endoscope by capturing an image of the inside of a lumen such as a digestive tract in the body of a subject. More specifically, the image processing apparatus performs a process of detecting an abnormal part (e.g., a lesion or a bleeding site) from the intraluminal image. As mentioned above, intraluminal images show shadows and contours of grooves formed by biological tissues such as mucous membrane structures. According to an aspect of the exemplary embodiments, to prevent the situation where the positions of such grooves (hereinafter, "groove positions") and contour portions are mistakenly detected as abnormal parts, a closed region is created within the intraluminal image in such a manner that the closed region does not include, on the inside and on the boundary thereof, any groove positions or contour portions, so that it is possible to detect abnormal parts for each of the created closed regions. According to an aspect of the exemplary embodiments, the intraluminal image is, for example, a color image that has, for each of the pixels, pixel values corresponding to wavelength components of red (R), green (G), and blue (B).

First Embodiment

Figure 2:
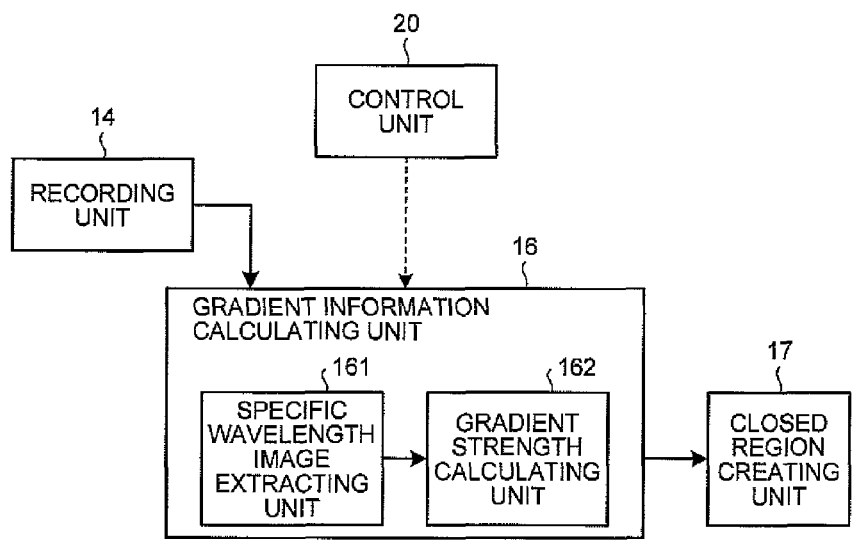
FIG. 2 is a block diagram explaining an exemplary configuration of a gradient information calculating unit according to the first embodiment.
Figure 3:
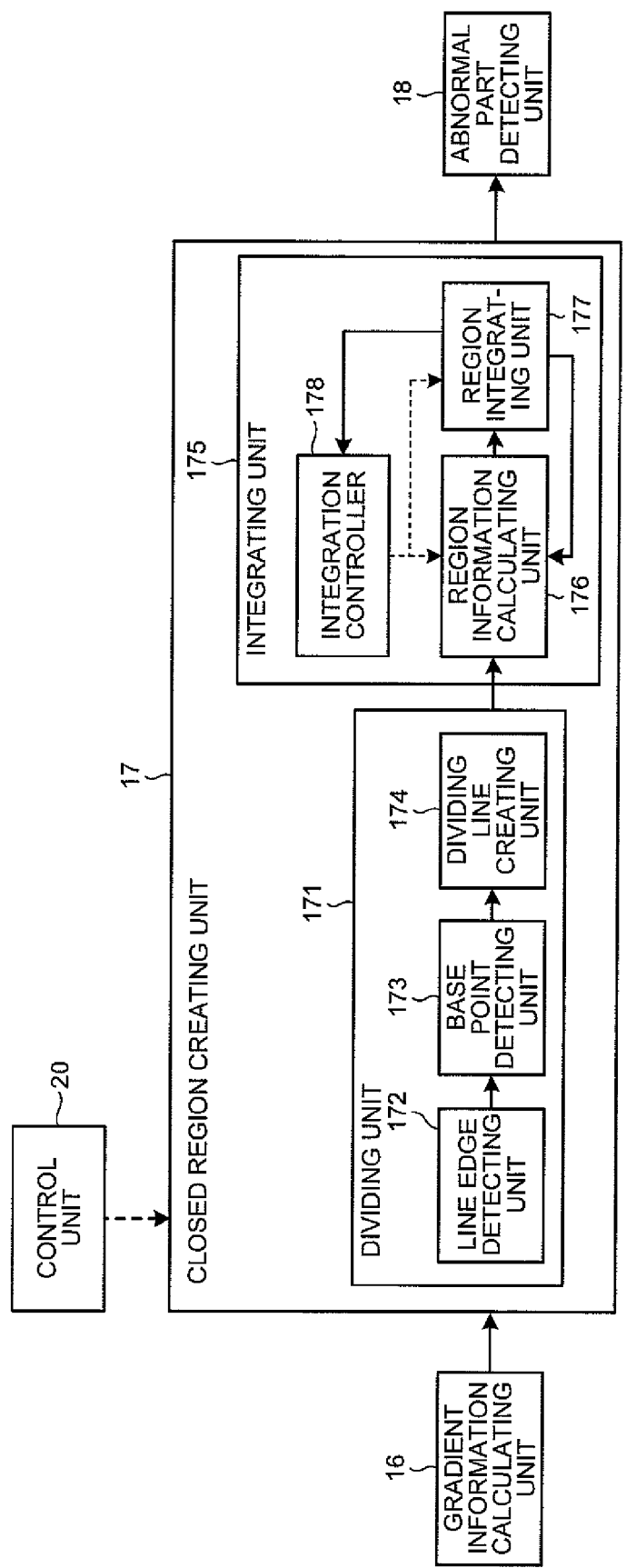
FIG. 3 is a block diagram explaining an exemplary configuration of a closed region creating unit according to the first embodiment.
Figure 4:
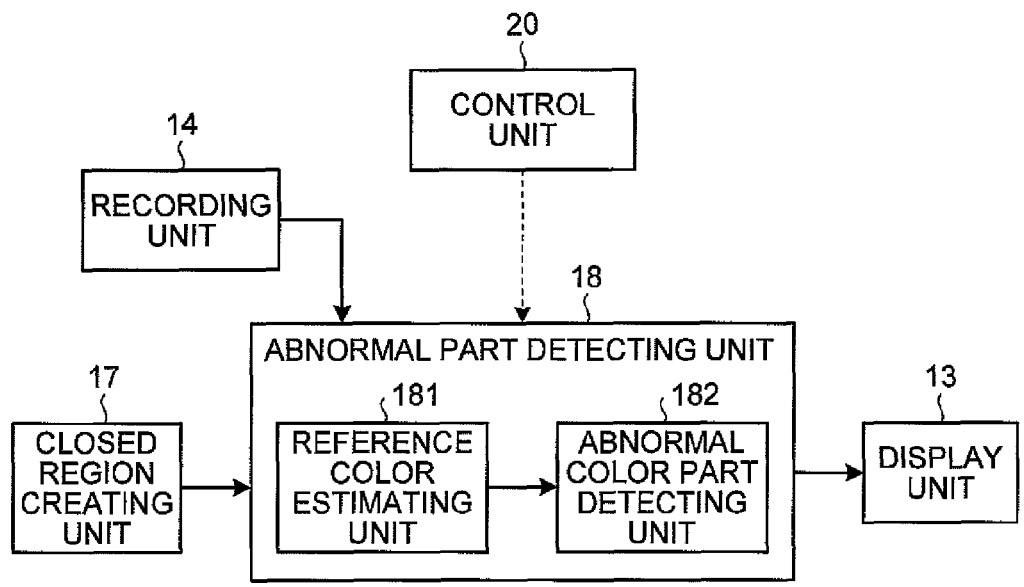
FIG. 4 is a block diagram explaining an exemplary configuration of an abnormal part detecting unit according to the first embodiment.

First, an image processing apparatus according to a first embodiment of the present invention will be explained. FIG. 1 is a block diagram explaining an exemplary functional configuration of an image processing apparatus 1 according to the first embodiment. FIG. 2 is a block diagram explaining an exemplary configuration of a gradient information calculating unit 16 included in a calculating unit 15. FIG. 3 is a block diagram explaining an exemplary configuration of a closed region creating unit 17. FIG. 4 is a block diagram explaining an exemplary configuration of an abnormal part detecting unit 18. In FIGS. 1 to 4, data signal lines connecting units included in the image processing apparatus 1 together and transferring data signals such as image signals are indicated with solid lines, whereas control signal lines transferring control signals are indicated with broken lines.

As shown in FIG. 1, the image processing apparatus 1 according to the first embodiment includes an external interface (I/F) unit 11, an operating unit 12, a display unit 13, a recording unit 14, the calculating unit 15, and a control unit 20 that controls an overall operation of the image processing apparatus 1.

The external I/F unit 11 obtains image data of an intraluminal image captured by a medical observation apparatus. The image data obtained by the external I/F unit 11 is recorded into the recording unit 14 and processed by the calculating unit 15, before being displayed on the display unit 13, as necessary and as appropriate. When the medical observation apparatus is a capsule endoscope where a portable recording medium is used for transferring image data to and from the medical observation apparatus, the external I/F unit 11 is configured with a reader that reads the image data of the intraluminal image stored in the recording medium detachably attached thereto. Alternatively, when a server that stores therein the image data of the intraluminal image captured by the medical observation apparatus is provided in an appropriate place so that the image data is obtained from the server, the external I/F unit 11 is configured with a communication apparatus or the like that establishes a connection to the server. In that situation, data communication is performed with the server via the external I/F unit 11 to obtain the image data of the intraluminal image. As another example, the external I/F unit 11 may be configured with an interface device or the like that receives, via a cable, an input of the image signal from the medical observation apparatus such as an endoscope.

The operating unit 12 is realized with, for example, a keyboard, a mouse, a touch panel, various types of switches, and the like and outputs an operating signal to the control unit 20. The display unit 13 is realized with a display device such as a Liquid Crystal Display (LCD) or an Electroluminescent (EL) display. Under control of the control unit 20, the display unit 13 displays various types of screens including a display screen for the image captured by a capsule endoscope 3.

The recording unit 14 is realized with any of various types of Integrated Circuit (IC) Memories (e.g., Read-Only Memories (ROMs), Random Access Memories (RAMs)) such as flash memories of which the recording is updatable, a hard disk that is built therein or connected by a data communication terminal, and an information recording medium such as a Compact Disk Read-Only Memory (CD-ROM) and a reading device therefor. The recording unit 14 records therein computer programs (hereinafter, "programs") for operating the image processing apparatus 1 and for realizing various functions of the image processing apparatus 1, as well as data used while such computer programs are executed. For example, the recording unit 14 records therein the image data of the intraluminal image obtained by the external I/F unit 11. Also, the recording unit 14 records therein an image processing program 141 for detecting an abnormal part from the intraluminal image.

The calculating unit 15 is realized with hardware such as a Central Processing unit (CPU) and performs various types of calculating processes to detect the abnormal part by processing the intraluminal image. The calculating unit 15 includes the gradient information calculating unit 16, the closed region creating unit 17, and the abnormal part detecting unit 18. The gradient information calculating unit 16, the closed region creating unit 17, and the abnormal part detecting unit 18 are connected in the stated order. Further, the image signal of the intraluminal image obtained via the external I/F unit 11 and recorded into the recording unit 14 is input to the gradient information calculating unit 16 and to the abnormal part detecting unit 18. Further, from the abnormal part detecting unit 18, information of the abnormal part processed by the constituent elements of the calculating unit 15 and detected from the intraluminal image as explained below is output together with the image signal of the intraluminal image and the like, so as to be input to the display unit 13.

Based on pixel values of the intraluminal image, the gradient information calculating unit 16 calculates a gradient strength, which is an example of gradient information. As shown in FIG. 2, the gradient information calculating unit 16 includes a specific wavelength image extracting unit 161 and a gradient strength calculating unit 162. The specific wavelength image extracting unit 161 is connected to the gradient strength calculating unit 162.

Based on the image signal of the intraluminal image input thereto from the recording unit 14, the specific wavelength image extracting unit 161 extracts an image corresponding to a specific wavelength component (hereinafter, a "specific wavelength component image") from the intraluminal image. As mentioned above, the intraluminal image obtained in the first embodiment includes wavelength components of red (R), green (G), and blue (B). The specific wavelength image extracting unit 161 extracts the specific wavelength component image, based on a predetermined specific wavelength component out of the wavelength components corresponding to red (R), green (G), and blue (B). The wavelength component used as the specific wavelength component is determined depending on the degree of absorption or dispersion within a living body. The extracted specific wavelength component image is output to the gradient strength calculating unit 162. The gradient strength calculating unit 162 calculates a gradient strength for each of the pixels in the specific wavelength component image input thereto. The gradient information calculating unit 16 configured as described above outputs the calculated gradient strengths to the closed region creating unit 17.

The closed region creating unit 17 creates a closed region satisfying a condition where the closed region does not include, on the inside thereof, any pixel of which the gradient strength is equal to or higher than a predetermined value, and also, the boundary thereof does not curve toward the interior of the closed region, with a curvature equal to or larger than a predetermined value. As shown in FIG. 3, the closed region creating unit 17 includes a dividing unit 171 and an integrating unit 175. The dividing unit 171 is connected to the integrating unit 175.

Based on the gradient strengths, the dividing unit 171 divides the intraluminal image into a plurality of regions. The dividing unit 171 includes a line edge detecting unit 172, a base point detecting unit 173, and a dividing line creating unit 174. The line edge detecting unit 172, the base point detecting unit 173, and the dividing line creating unit 174 are connected in the stated order.

The line edge detecting unit 172 detects a line edge based on the gradient strengths input thereto from the gradient information calculating unit 16. The detected line edge is output to the base point detecting unit 173. Based on the line edge input thereto, the base point detecting unit 173 detects an end point of the line edge and a curving point at which the line edge curves with a curvature equal to or larger than a predetermined value. The base point detecting unit 173 then sets the end point and the curving point detected as base points of dividing lines. The set base points are output to the dividing line creating unit 174, together with the input line edge. Based on the line edge and the base points input thereto, the dividing line creating unit 174 draws the dividing lines in horizontal and vertical directions until each of the dividing lines meets a line edge or a rim of the image. Further, the dividing unit 171 divides the intraluminal image into regions defined by the line edges detected by the line edge detecting unit 172 and the dividing lines drawn by the dividing line creating unit 174 and outputs information (e.g., divided images explained below) identifying positions of the regions resulting from the division, to the integrating unit 175.

The integrating unit 175 integrates two or more of the divided regions obtained by the dividing unit 171. The integrating unit 175 includes a region information calculating unit 176, a region integrating unit 177, and an integration controller 178. The region information calculating unit 176 is connected to the region integrating unit 177, whereas the region integrating unit 177 is connected to the region information calculating unit 176 and to the integration controller 178. Further, a control signal from the integration controller 178 is input to the region information calculating unit 176 and to the region integrating unit 177, so that the integration controller 178 controls operations of the region information calculating unit 176 and the region integrating unit 177.

The region information calculating unit 176 calculates region information. More specifically, in a process performed the first time, based on the information identifying the positions of the plurality of regions input thereto from the dividing unit 171, the region information calculating unit 176 calculates, as the region information, feature data from a particle analysis, which is an example of shape feature data, as well as the length of a boundary with an adjacent region. Also, information identifying the position of the region resulting from the integration is input to the region information calculating unit 176 from the region integrating unit 177. In a process performed the second time and later, based on the information identifying the position of the region resulting from the integration, the region information calculating unit 176 calculates the region information of the region resulting from the integration. The calculated region information is output to the region integrating unit 177.

Based on the region information input thereto, the region integrating unit 177 selects the regions to be integration targets and integrates the selected regions. More specifically, the region integrating unit 177 integrates the regions while satisfying the following condition mentioned above: the region resulting from the integration (hereinafter, the "integrated region") does not include, on the inside thereof, any pixel of which the gradient strength is equal to or higher than the predetermined value, and also, the boundary thereof does not curve toward the interior of the integrated region, with a curvature equal to or larger than the predetermined value. Further, the region integrating unit 177 outputs the information identifying the position of the integrated region, to the region information calculating unit 176. Also, when there are no regions to be integration targets, the region integrating unit 177 outputs a notification so indicating, to the integration controller 178.

The integration controller 178 controls the repetition of the processes in which the region information calculating unit 176 calculates the region information and the region integrating unit 177 integrates the regions. Further, when receiving an input from the region integrating unit 177 notifying that there are no longer regions to be integration targets, the integration controller 178 ends the repetition of the processes performed by the region information calculating unit 176 and the region integrating unit 177.

As explained above, the closed region creating unit 17 divides the intraluminal image into the plurality of regions, based on the edge lines and the base points, which are the end points and the curving points of the edge lines, and subsequently integrate two or more of the divided regions. Further, the closed region creating unit 17 determines the regions obtained when the integration ends as the closed regions and outputs the information identifying the positions of the closed regions to the abnormal part detecting unit 18.

The abnormal part detecting unit 18 detects abnormal parts, if any, from the inside of each of the closed regions. As shown in FIG. 4, the abnormal part detecting unit 18 includes a reference color estimating unit 181 and an abnormal color part detecting unit 182. The reference color estimating unit 181 is connected to the abnormal color part detecting unit 182.

For each of the closed regions input thereto from the closed region creating unit 17, the reference color estimating unit 181 estimates a reference color indicating a normal biological tissue. The estimated reference color is output to the abnormal color part detecting unit 182. The abnormal color part detecting unit 182 detects such a region within each of the closed regions that has color feature data (an outlier) deviating from the input reference color by a value equal to or larger than a predetermined value, as an abnormal color part. The predetermined value may be a fixed value or may be a variable value that can be set through a user operation performed via the operating unit 12 or the like. The abnormal part detecting unit 18 configured as described above outputs the abnormal color part detected from the inside of any of the closed regions to the display unit 13, as the abnormal part.

The control unit 20 is realized with hardware such as a CPU. The control unit 20 transfers, for example, instructions and data to the constituent elements of the image processing apparatus 1, based on the image data obtained via the external I/F unit 11, the operation signal input thereto from the operating unit 12, and the programs and the data recorded in the recording unit 14, so as to integrally control the operation of the entirety of the image processing apparatus 1.

Next, an outline of the abnormal part detecting process will be explained. In the present example, as explained in detail below, the abnormal part is detected by performing a morphology process, for example, a three-dimensional morphology process (gray-scale morphology) that uses a structure element having a spherical shape. In this situation, the morphology process includes an opening process (see CG-ARTS Society, "Shuushuku/Bouchou Shori [contraction/expansion processing]", Digital Gazou Shori [digital image processing], page 179) and a closing process (see CG-ARTS Society, "Shuushuku/Bouchou Shori [contraction/expansion processing]", Digital Gazou Shori [digital image processing], page 179). The opening process is a process to calculate a locus (a plane) drawn by a maximum value of the outer circumference of a reference figure (e.g., a sphere in the present example) called a structure element, when the structure element is moved while being circumscribed from the side having smaller pixel values (i.e., a lower side) of a target region, within a three-dimensional space in which the pixel values are considered as heights. In contrast, the closing process is a process to calculate a locus (a plane) drawn by a minimum value of the outer circumference of the structure element, when the structure element is moved while being circumscribed from the side having larger pixel values (i.e., an upper side) of the target region, within the same three-dimensional space. When the opening process is used, a value on the obtained locus is used as the reference value, so that pixels each having a large difference from the actual pixel values are detected as the abnormal part (the abnormal color part). Similarly, when the closing process is used, pixels each having a large difference between the reference value on the obtained locus and the actual pixel value are detected as the abnormal part (the abnormal color part).

Figure 5:
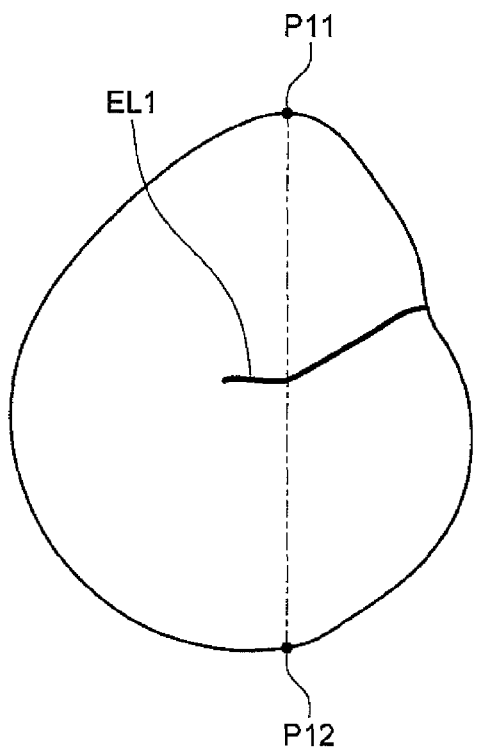
Figure 6:
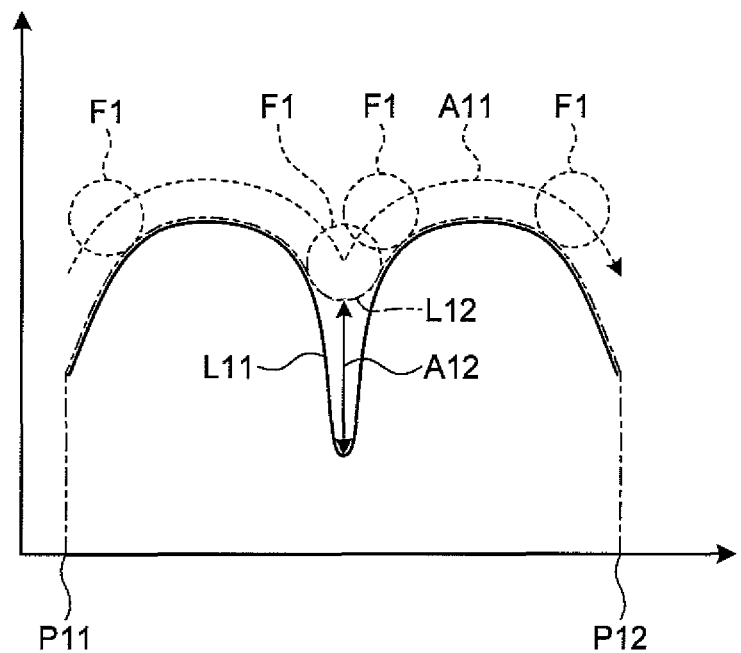
FIG. 6 is a chart of a change curve of pixel values on the line indicated with a dashed line in FIG. 5.

When abnormal parts are detected for each of the closed regions by applying the morphology process including the opening process or the closing process mentioned above, if a groove position is included on the inside of a closed region, there are situations where the groove position is mistakenly detected as an abnormal part. FIG. 5 is a schematic drawing of an example of a closed region. FIG. 5 depicts the closed region created so as to include, on the inside thereof, an edge EL1 representing a groove position or the like. FIG. 6 is a chart of a change curve L11 of pixel values, while the horizontal axis expresses pixel positions between boundary pixels P11 and P12 on the line (i.e., the line crossing the edge EL1) indicated by a dashed line in FIG. 5, whereas the vertical axis expresses the pixel values of the corresponding pixels. As shown in FIG. 6, on the line crossing the edge EL1, the change curve of the pixel values locally exhibits a large dent in the edge position. For this reason, when the morphology process (the closing process) is performed on the closed region including the edge EL1 on the inside thereof, so that a structure element F1 is moved while being circumscribed from the upper side (an arrow A11), if the structure element F1 is too large for the width of the dent mentioned above, because the structure element F1 is not able to go into the dent, a locus L12 (which is actually a plane) indicated by a dashed line in FIG. 6 is obtained. As explained here, when the closed region includes, on the inside thereof, the edge EL1 representing a groove position or the like, the estimated reference color significantly deviates from the actual pixel value, depending on the shape of the structure element F1. As mentioned above, during the abnormal part detecting process, the pixels each having a large difference are detected as the abnormal part (the abnormal color part), while using the values on the obtained locus L12 as the reference color and comparing the pixel value of each of the pixels with the reference color. Accordingly, if a closed region is created so as to include, on the inside thereof, an edge representing a groove position or the like, there are situations where the part with the edge EL1 is mistakenly detected as an abnormal part because of the difference indicated by an arrow A12.

Figure 7:
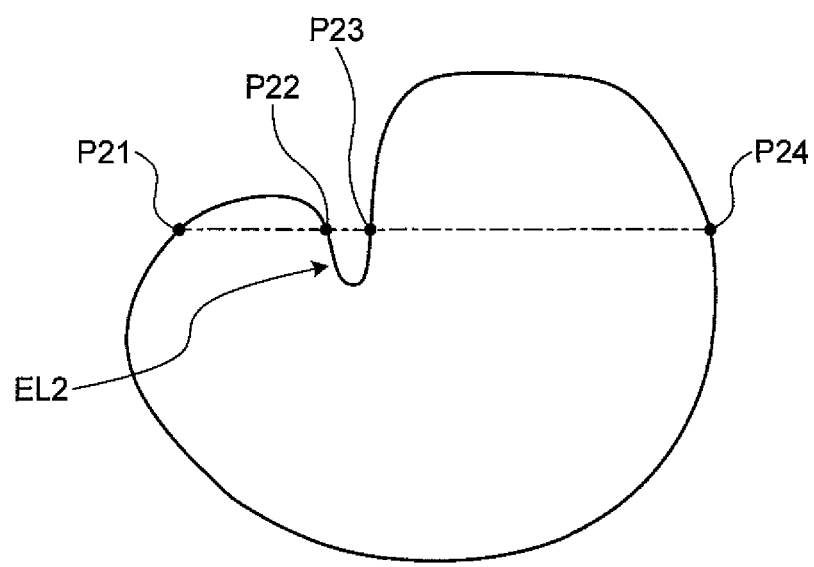
Figure 8:
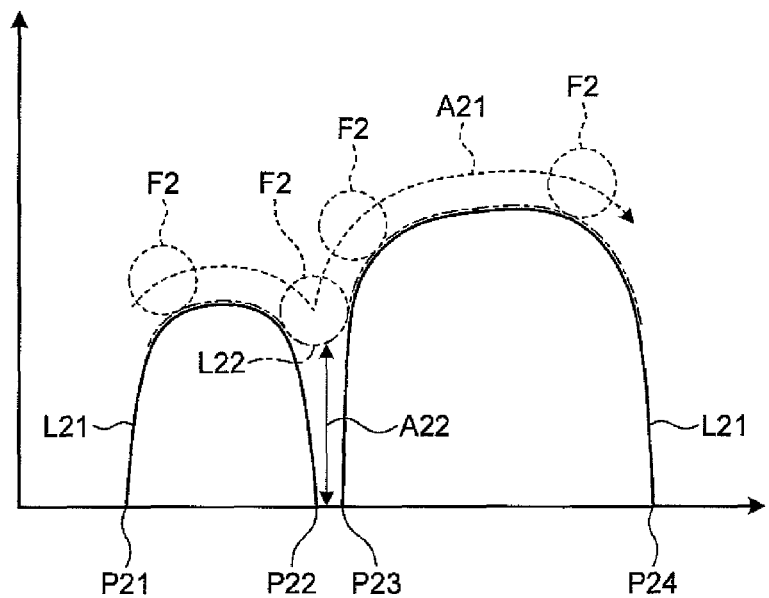
FIG. 8 is a chart of a change curve of pixel values on the line indicated with a dashed line in FIG. 7.

Similarly, when the boundary of a closed region includes a contour portion that curves toward the interior with a curvature equal to or larger than a predetermined value, there are situations where the contour portion is mistakenly detected as an abnormal part. FIG. 7 is a schematic drawing of another example of a closed region. FIG. 7 depicts the closed region created so as to include, on the boundary thereof, an edge EL2 that curves toward the interior with a curvature equal to or larger than a predetermined value and that represents a contour portion or the like. FIG. 8 is a chart of a change curve L21 of pixel values, while the horizontal axis expresses pixel positions between boundary pixels P21 and P24 on the line (i.e., the line crossing the curving portion of the edge EL2) indicated by a dashed line in FIG. 7, whereas the vertical axis expresses the pixel values of the pixels between the boundary pixels P21 and P22 and between the boundary pixels P23 and P24, which are positioned on the inside of the closed region. As shown in FIG. 8, on the line crossing the curving portion of the edge EL2, the change curve of the pixel values is cut off at the curving position. In this situation, when the morphology process (the closing process) is performed on the closed region including the edge EL2 where the boundary significantly curves toward the interior, so that a structure element F2 is moved while being circumscribed from the upper side (an arrow A21), if the structure element F2 is too large for the gap of the cut-off portion mentioned above, because the structure element F2 is not able to go into the cut-off portion, a locus L22 (which is actually a plane) indicated by a dashed line in FIG. 8 is obtained. As explained here, when the boundary of a closed region includes an edge that represents a contour portion or the like and that significantly curves toward the interior, the reference color estimated depending on the shape of the structure element deviates from the actual pixel value significantly, like in the situation where a closed region includes, on the inside thereof, an edge representing a groove position or the like. As a result, there are situations where the contour portion is mistakenly detected as an abnormal part because of the difference indicated by an arrow A22.

To inhibit the situation described above, the closed region creating unit 17 creates a closed region satisfying the condition where the closed region does not include, on the inside thereof, any pixel (i.e., any pixel in an edge portion) of which the gradient strength is equal to or higher than the predetermined value, and also, the boundary of the closed region does not curve toward the interior with a curvature equal to or larger than the predetermined value. With this arrangement, during the abnormal part detecting process performed at the subsequent stage by applying the morphology process, it is possible to properly estimate the reference color.

Figure 9:
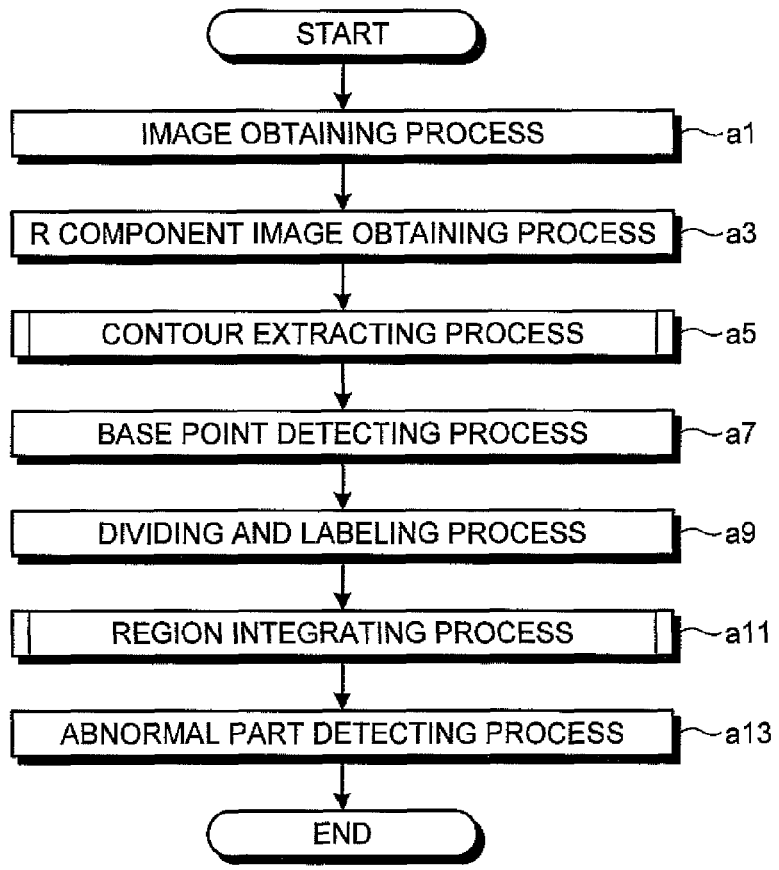
FIG. 9 is an overall flowchart of a processing procedure performed by the image processing apparatus according to the first embodiment.

FIG. 9 is an overall flowchart of a processing procedure performed by the image processing apparatus 1 according to the first embodiment. The process explained below is realized when the constituent elements of the image processing apparatus 1 operate according to the image processing program 141 recorded in the recording unit 14.

As shown in FIG. 9, the control unit 20 first performs an image obtaining process to obtain an intraluminal image being a processing target (step a1). As a result of this process, the image data of the intraluminal image is obtained via the external I/F unit 11 and recorded into the recording unit 14. After the image data of the intraluminal image is obtained in this manner, the image data is readable by the constituent elements such as the calculating unit 15. In the following sections, the pixel value of each of the pixels constituting the intraluminal image will be expressed as (x, y), where x is the coordinate in the horizontal direction and y is the coordinate in the vertical direction, while using the upper left corner of the obtained intraluminal image is used as a reference point.

Subsequently, in the calculating unit 15, the specific wavelength image extracting unit 161 included in the gradient information calculating unit 16 performs an R component image obtaining process to extract an R (red) component image as the specific wavelength component image, from the intraluminal image obtained at step a1 (step a3).

Figure 10:
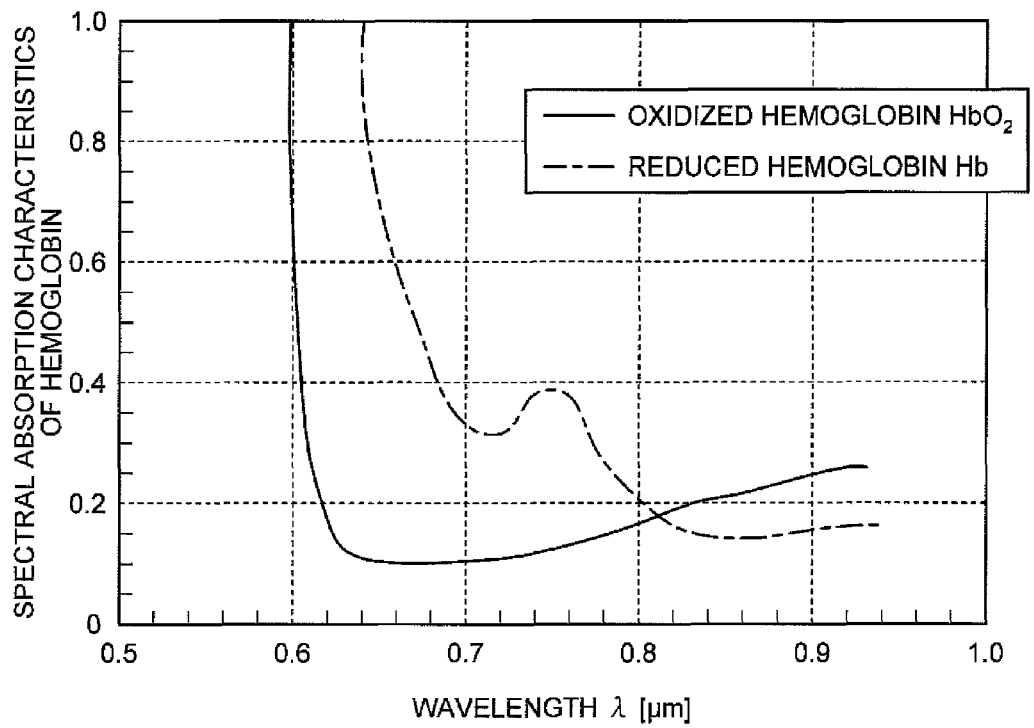
FIG. 10 is a chart indicating spectral absorption characteristics of hemoglobin.

Hemoglobin, which is a constituent component of blood vessels and bleeding sites shown in the intraluminal image, has a characteristic where the light in a short-wavelength band is absorbed more. FIG. 10 is a chart indicating spectral absorption characteristics of hemoglobin. A change curve of oxidized hemoglobin $HbO_2$ is indicated with a solid line, whereas a change curve of reduced hemoglobin Hb is indicated with a dashed line, while the horizontal axis expresses the wavelength $\lambda$. Due to the light absorption characteristics of hemoglobin in short-wavelength bands, the luminance values of a G (green) component and a B (blue) component, of which a large part of the wavelength components is in a short-wavelength band, become smaller when hemoglobin absorbs the light. In contrast, an R (red) component, of which a large part of the wavelength component is in a long-wavelength band, absorbs little light and reflects most of the light. As a result, from the R (red) component, it is possible to obtain information best reflecting the surface structure of the biological tissues. For this reason, in the first embodiment, to obtain the contour of the biological tissues formed by the surface structure of the biological tissues, the R (red) component image (i.e., an image in which the R (red) component value is used as the pixel value of each of the pixels) is extracted as the specific wavelength component image, while using the R (red) component as the specific wavelength component.

Figure 11:
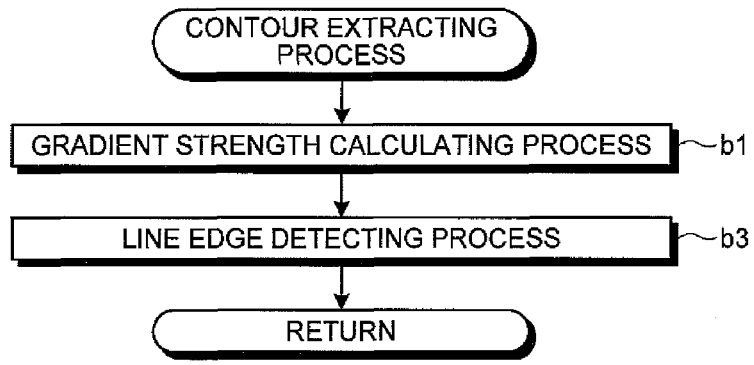
FIG. 11 is a flowchart of a detailed processing procedure in a contour extracting process according to the first embodiment.

After that, the process proceeds to a contour extracting process (step a5). During the contour extracting process, a line edge is detected from the specific wavelength component, so that the detected line edge is extracted as a contour of the biological tissues. FIG. 11 is a flowchart of a detailed processing procedure in the contour extracting process.

As shown in FIG. 11, during the contour extracting process, the gradient strength calculating unit 162 in the gradient information calculating unit 16 first performs a gradient strength calculating process to calculate the gradient strength of the specific wavelength component image (step b1). For example, the gradient strength is calculated for each of the pixels by performing, on the specific wavelength component image, Sobel processing, which is already publicly-known as a filtering process by which a smoothing process to reduce noise and a differential process are performed at the same time (see CG-ARTS Society, "Sobel Filter", Digital Gazou Shori [digital image processing], page 116). It should be noted, however, that the applicable processing is not limited to the Sobel processing. It is acceptable to use any other filters, as long as a smoothing process and a differential process are combined in the filter.

Subsequently, in the closed region creating unit 17, the line edge detecting unit 172 in the dividing unit 171 performs a line edge detecting process to detect the line edge in the specific wavelength component image, based on the gradient strengths (step b3). For example, the line edge is detected by detecting a position of the maximum gradient based on the gradient strengths and subsequently performing a threshold process on the detected position of the maximum gradient. The threshold value used in the threshold process may be a fixed value or may be a variable value that can be set through a user operation performed via the operating unit 12 or the like. After that, by using Expressions (1) and (2) shown below, "1" is assigned to each of the pixels on the detected line edge, whereas "0" is assigned to each of the pixels other than those on the line edge, so as to obtain the contour image.
For each of the pixels on the line edge:

$$H(x,y)=1 \quad (1)$$

For each of the pixels other than those on the line edge:

$$H(x,y)=0 \quad (2)$$

In this situation, as an algorithm specifically realizing the process at step b1 performed by the gradient strength calculating unit 162 and the process at step b3 performed by the line edge detecting unit 172 in the contour extracting process explained above, the Canny's edge detecting algorithm, which is already publicly-known, may be used (see CG-ARTS Society, "Rinkakusen Kenshutsu [contour detection]", Digital Gazou Shori [digital image processing], page 209). When the contour extracting process has been performed in this manner, the process returns to step a5 in FIG. 9, before proceeding to step a7.

At step a7, the base point detecting unit 173 performs a base point detecting process to detect base points used for drawing dividing lines, based on the line edge. In the first embodiment, patterns (hereinafter, "base point patterns") in which the line edge is present in the surrounding (e.g., eight neighboring pixels) of an end point or a curving point are defined in advance. In each of FIGS. 12A to 12H and FIGS. 13A to 13H, a base point pattern is shown. The eight types of base point patterns shown in FIGS. 12A to 12H and FIGS. 13A to 13H correspond to base point patterns of an end point, whereas the eight types of base point patterns shown in FIGS. 13A to 13H correspond to base point patterns of an end point or a curving point. In this situation, to identify each of the eight neighboring pixels of a center pixel, the coordinate thereof will be expressed as a, b, c, d, e, f, g, and h, clockwise from the upper left corner, as shown in the grid cells for the eight neighboring cells in each of the drawings. In the drawings, the grid cells indicated with hatching are the pixels representing a line edge. As the process at step a7 shown in FIG. 9, while sequentially using each of the pixels positioned on the line edge as a pixel of interest, the base point detecting unit 173 judges whether the presence pattern of the line edge in the eight neighboring pixels thereof matches any of the base point patterns shown in FIGS. 12A to 12H and FIGS. 13A to 13H. Further, the base point detecting unit 173 detects the pixel on the line edge judged to match any of the patterns, as an end point or a curving point.

In actuality, based on the contour image, the base point detecting unit 173 judges whether the eight neighboring pixels of each of the pixels satisfying H(x,y)=1 matches any of the base point patterns and detects an end point or a curving point, while using Expressions (3) and (4) shown below.
For a pixel satisfying H(x,y)=1:

If one of Conditions 1 and 2 is satisfied, $H(x,y)=2$ (3)

If neither of Conditions 1 and 2 is satisfied, $H(x,y)=1$, (4)

where $H(a)+H(b)+H(c)+H(d)+H(e)+H(f)+H(g)+H(h)=1$;   Condition 1:

$H(a)+H(b)+H(c)+H(d)+H(e)+H(f)+H(g)+H(h)=2$,   Condition 2:

and also, $H(a)H(b)+H(b)H(c)+H(c)H(d)+H(d)H(e)$ $+H(e)H(f)+H(f)H(g)+H(g)H(h)+H(h)H(a)=1$ In Expressions (3) and (4), whether Condition 1 is satisfied or not corresponds to the judgment of whether the pattern matches any of the base point patterns shown in FIGS. 12A to 12H. In other words, because one of the eight neighboring pixels is a pixel on a line edge in the base point patterns shown in FIGS. 12A to 12H, the total of the pixel values of the eight neighboring pixels being "1" is used as Condition 1. Further, whether Condition 2 is satisfied or not corresponds to the judgment of whether the pattern matches any of the base point patterns shown in FIGS. 13A to 13H. In other words, because two adjacent pixels out of the eight neighboring pixels are pixels on a line edge in the base point patterns shown in FIGS. 13A to 13H, the total of the pixel values of the eight neighboring pixels being "2", while a sum of the values obtained by multiplying the pixel values of two adjacent pixels by each other being "1" is used as Condition 2.

After that, according to Expression (3), among the pixels being positioned on the line edge and satisfying H(x,y)=1, the base point detecting unit 173 sets any pixel satisfying Condition 1 and corresponding to an end point and any pixel satisfying Condition 2 and corresponding to an end point or a curving point as the base points of the dividing lines, by assigning H(x,y)=2 thereto. Further, according to Expression (4), among the pixels being positioned on the line edge and satisfying H(x,y)=1, the base point detecting unit 173 maintains H(x,y)=1 for any pixel that satisfies neither one of Conditions 1 and 2. In the present example, the end points and the curving points are detected according to Expressions (3) and (4); however, the detecting method is not limited to this example. For example, it is acceptable to detect the end points and the curving points by using a matching method. For instance, it is acceptable to adopt any other method as appropriate, as long as it is possible to detect the end points and the curving points that curve with a curvature equal to or larger than the predetermined value, with respect to the line edges defined by the base point patterns shown in FIGS. 12A to 12H and FIGS. 13A to 13H.

Subsequently, as shown in FIG. 9, the process proceeds to a dividing and labeling process (step a9). During the dividing and labeling process, the dividing line creating unit 174 first draws dividing lines, up to an intersection with a pixel being positioned on a line edge and satisfying H(x,y)=1, starting with each of the pixels being set as the base points and satisfying H(x,y)=2. If the dividing line does not intersect any pixel satisfying H(x,y)=1, the dividing line creating unit 174 draws the dividing line, up to the rim of the image. In the first embodiment, an example in which the dividing lines are drawn in horizontal and vertical directions is discussed; however, the directions in which the dividing lines are drawn are not limited to the horizontal and the vertical directions. It is acceptable to set any other direction as appropriate, as long as the dividing lines are drawn in two or more mutually-different directions.

Figure 14:
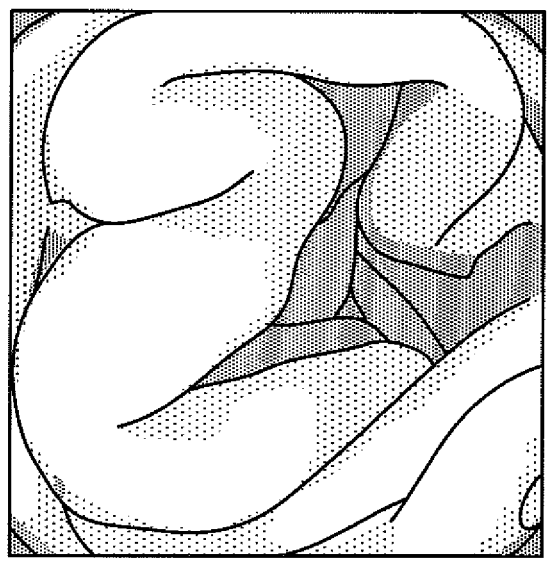
FIG. 14 is a drawing of an example of an intraluminal image.
Figure 15:
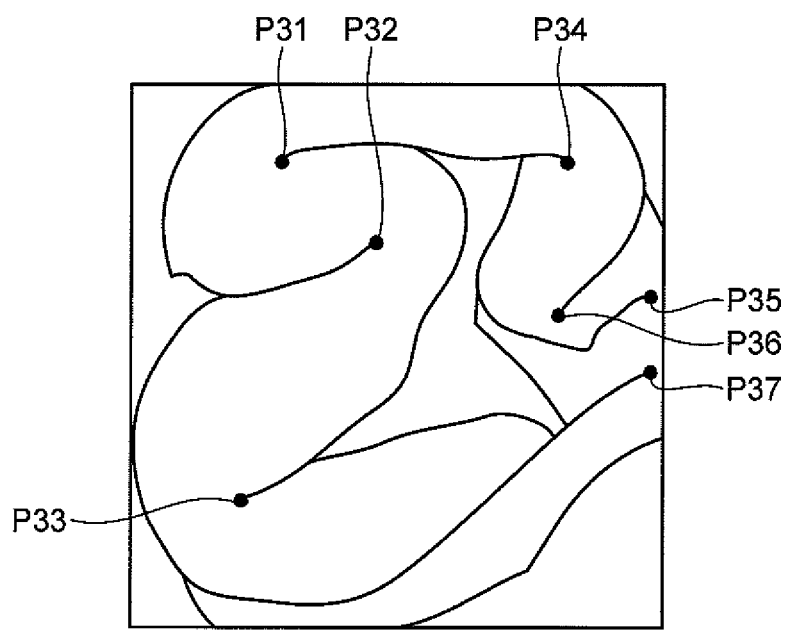
FIG. 15 is a drawing of a part of line edges detected by processing the intraluminal image in FIG. 14 and base points of these line edges.
Figure 16:
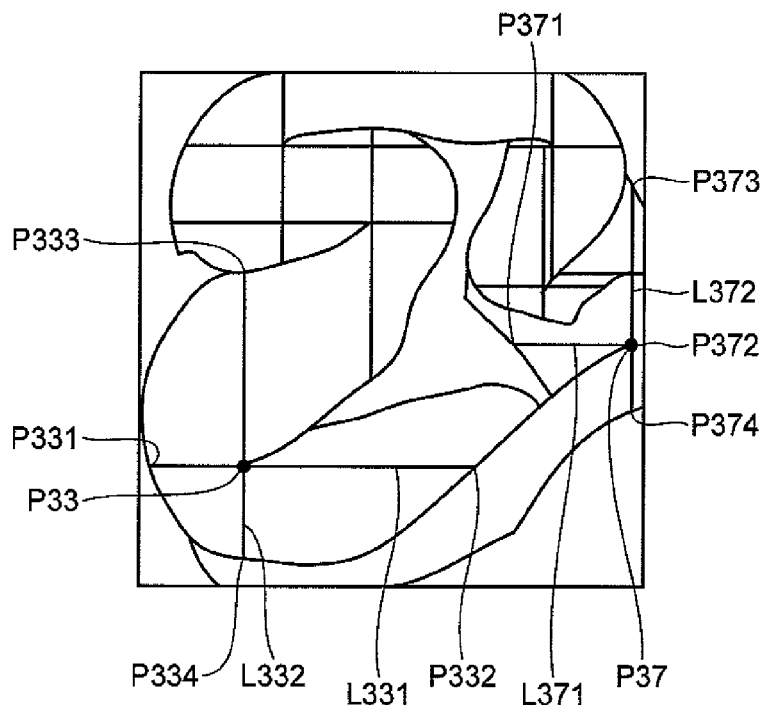
FIG. 16 is a schematic drawing of dividing lines drawn based on the line edges and the base points shown in FIG. 15.

Next, the dividing and labeling process will be explained with reference to FIGS. 14 to 16. FIG. 14 is a drawing of an example of an intraluminal image. FIG. 15 is a drawing of a part of line edges detected by processing the intraluminal image in FIG. 14 and base points of these line edges. FIG. 15 depicts seven base points P31 to P37. FIG. 16 is a schematic drawing of dividing lines drawn based on the line edges and the base points shown in FIG. 15.

For example, in FIG. 16, with regard to a base point P33, the dividing line creating unit 174 draws a dividing line L331, which is a horizontal straight line passing through the base point P33 and of which the end points are intersections P331 and P332 with a line edge. The dividing line creating unit 174 further draws a dividing line L332, which is a vertical straight line passing through the base point P33 and of which the end points are intersections P333 and P334 with a line edge. With regard to a base point P37, the dividing line creating unit 174 draws a dividing line L371, which is a horizontal straight line passing through the base point P37 and of which the end points are an intersection P371 with a line edge and the rim of the image P372. The dividing line creating unit 174 further draws a dividing line L372, which is a vertical straight line passing through the base point P37 and of which the end points are intersections P373 and P374 with a line edge.

After that, based on the line edges detected by the line edge detecting unit 172 and the dividing lines drawn by the dividing line creating unit 174, the dividing unit 171 divides the intraluminal image into a plurality of regions that are defined by the line edges and the dividing lines. This process is realized by assigning an identical label to the pixels in each of the regions defined by the line edges and dividing lines. In the present example, because there are two or more divided regions, label numbers each of which is unique to the corresponding region are assigned. Further, for example, a divided image in which the pixel value of each of the pixels is arranged to be the label number of the region to which the pixel belongs is obtained. As a method for assigning the label numbers, for example, a labeling process that is already publicly known may be used (see CG-ARTS Society, "Labeling", Digital Gazou Shori [digital image processing], page 181).

Figure 17:
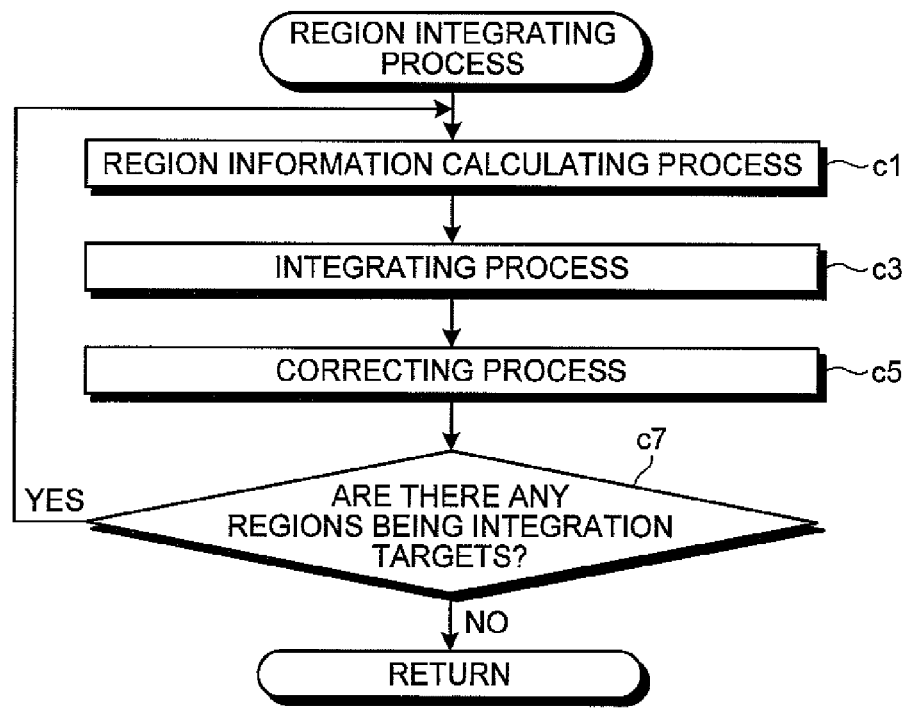
FIG. 17 is a flowchart of a detailed processing procedure in a region integrating process.

Subsequently, as shown in FIG. 9, the integrating unit 175 performs a region integrating process (step a11). During the region integrating process, the integrating unit 175 calculates region information for each of the regions by referring to the divided images and integrates two or more regions based on the calculated region information. FIG. 17 is a flowchart of a detailed processing procedure in the region integrating process.

As shown in FIG. 17, during the region integrating process, the region information calculating unit 176 first performs a region information calculating process (step c1). For example, the region information calculating unit 176 calculates feature data of each of the regions by performing a particle analysis, which is publicly known, on the plurality of regions. In the present example, for instance, the region information calculating unit 176 calculates a horizontal Feret's diameter, a vertical Feret's diameter, and an area size of each of the regions as the feature data for the particle analysis. Also, the region information calculating unit 176 calculates the lengths of the boundaries with the adjacent regions. For example, the region information calculating unit 176 processes the regions one by one, while sequentially using each of the regions as a region of interest, and identifies the dividing lines forming the boundaries with the adjacent regions thereof. Further, the region information calculating unit 176 calculates the lengths of the identified dividing lines as the lengths of the boundaries with the adjacent regions. If there are two or more dividing lines forming the boundaries of the region of interest, the region information calculating unit 176 calculates the lengths of the boundaries with the adjacent regions, for each of the dividing lines. In this manner, for each of the regions, the region information calculating unit 176 calculates the region information, which includes the feature data for the particle analysis, the lengths of the boundaries with the adjacent regions, and the positions of the region.

Subsequently, the region integrating unit 177 performs an integrating process to integrate two or more of the divided regions, based on the region information (step c3). After that, the region integrating unit 177 performs a correcting process to correct the regions resulting from the integration ("integrated region") (step c5).

As explained above, the region integrating unit 177 integrates the regions under the condition where the integrated region does not include, on the inside thereof, any pixel of which the gradient strength is equal to or higher than the predetermined value, and also, the boundary thereof does not curve toward the interior of the integrated region, with a curvature larger than the predetermined value. In this situation, the condition where the integrated region does not include, on the inside thereof, any pixel of which the gradient strength is equal to or higher than the predetermined value will be referred to as a "first region condition", whereas the condition where the boundary thereof does not curve toward the interior of the integrated region with a curvature larger than the predetermined value will be referred to as a "second region condition". In the first embodiment, as explained at step b3 in FIG. 11, the edge line (i.e., the pixels of which the gradient strength is equal to or higher than the predetermined value) is detected by performing the threshold process on the gradient strengths. Also, as explained at step a7 in FIG. 9, a curving point at which the line edge curves with a curvature equal to or larger than the predetermine value (in actuality, the curving point as well as the end points of the edge) is detected as a base point. In this situation, by integrating two or more regions in such a manner that the integrated region does not include, on the inside thereof, any line edge including those base points, the integrating process is performed while satisfying the first and the second region conditions. For example, in the first embodiment, this process is realized by performing the integration process so as to keep at least one of the dividing lines extending along the horizontal and the vertical directions that pass through each of the base points.

Figure 19:
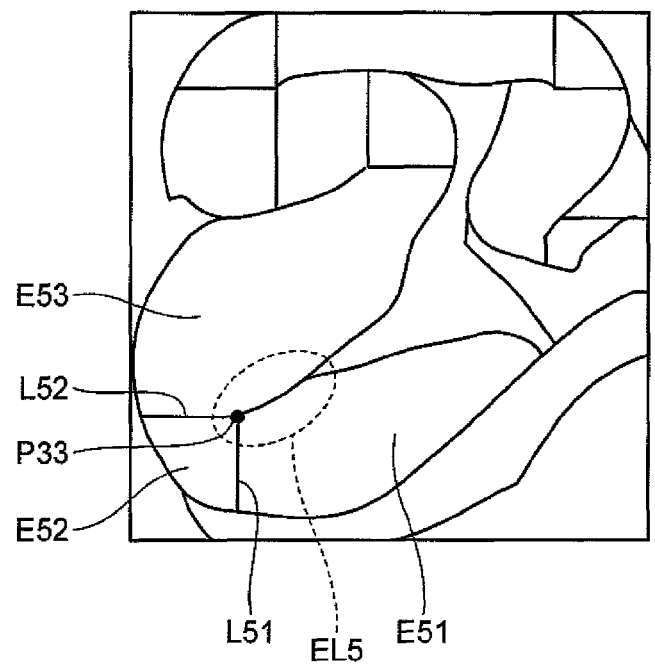
FIG. 19 is a schematic drawing of a result of integrating regions.
Figure 20:
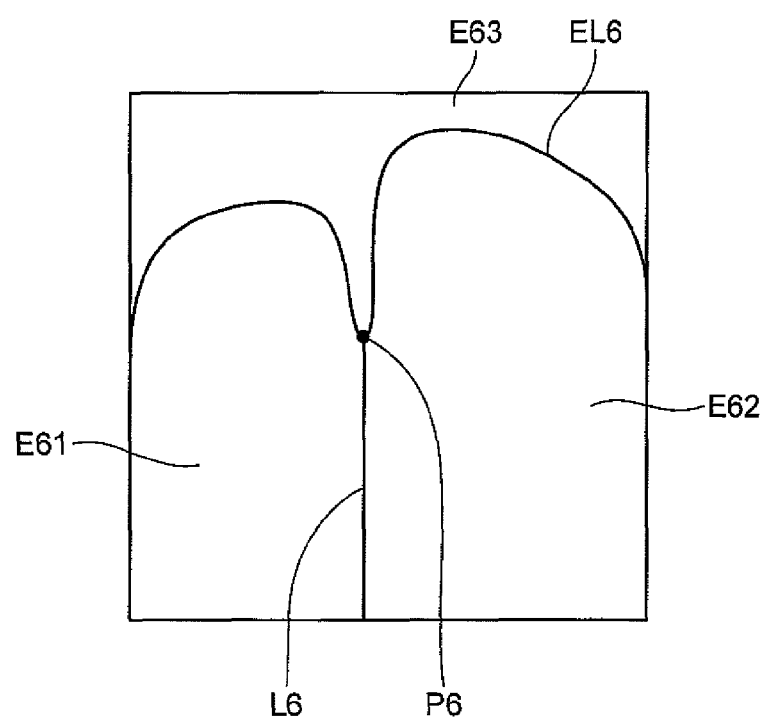
FIG. 20 is another schematic drawing of a result of an integration.

FIG. 18 is a drawing explaining a principle for integrating regions and depicts a manner in which two (i.e., E41 and E42) of the regions sectioned by the dividing lines shown in FIG. 16 are integrated. FIG. 19 is a schematic drawing of a result of integrating the regions shown in FIG. 16. FIG. 20 is another schematic drawing of a result of an integration. For example, with regard to the region E41 indicated with hatching in FIG. 18(a), the dividing lines forming the boundaries of the region E41 are the four lines, L41 to L44. The length of L41 and L43 is longer than the length of L42 and L44. The region E42 positioned adjacent to the region E41 while the dividing line L41, which is one of the longer lines, is interposed therebetween is smaller in area than a region E43 positioned adjacent to the region E41 while the dividing line L43 is interposed therebetween. In this situation, first, the region E41 and the region E42 are integrated together. As a result, the two regions E41 and E42 are integrated into one region E44, as shown in FIG. 18(b). At step c3, the region integrating process described above is repeatedly performed so as to create closed regions.

To be more specific, when two or more regions are integrated, the integrating process is performed so as to keep at least one of the dividing lines extending along the horizontal and the vertical directions that pass through each of the base points, as mentioned above. For example, suppose that regions E51 and E52 sectioned by a dividing line L51 in FIG. 19 were integrated, and subsequently, the region resulting from the integration was further integrated with a region E53 sectioned by a dividing line L52. In this situation, none of the dividing lines extending from the base point P33 would remain. If an integrating process was performed in this manner, the regions E51, E52, and E53 would be integrated into one region, and the region resulting from the integration would include, on the inside thereof, an edge indicated with a broken line EL5 in FIG. 19 that includes the base point P33 being an end point. Each of the points positioned on the edge indicated by the broken line EL5 would correspond to a pixel of which the gradient strength is equal to or higher than the predetermined value, and the first region condition therefore would not be satisfied. For this reason, this type of integration is not performed.

In the example shown in FIG. 20, an edge EL6 includes a base point P6, which is a curving point curving toward the interior with a curvature larger than the predetermined value. In FIG. 20, three regions E61, E62, and E63 that are defined by the edge EL6 and the dividing line L6 (i.e., sectioned by the edge EL6 and the dividing line L6) are shown. In this situation, suppose that the regions E61 and E62 positioned adjacent to each other while the dividing line L6 is interposed therebetween were integrated together. In this situation, none of the dividing lines extending from the base point P6 would remain. If this type of integrating process was performed, the region E61 and the region E62 would be integrated into one region, so that the boundary of the region resulting from the integration would include the base point P6, which is a curving point, and the second region condition therefore would not be satisfied. For this reason, this type of integration is not performed.

During the actual integrating process, as the process at step c3, the region integrating unit 177 first calculates a ratio between the horizontal Feret's diameter and the vertical Feret's diameter of each of the regions, based on the region information, and selects regions each having a large ratio as the integration targets, for the purpose of reducing the number of oblong regions. Subsequently, based on the lengths of the boundaries with the adjacent regions indicated in the region information of the regions being the integration targets, the region integrating unit 177 selects two longer dividing lines from among the dividing lines structuring the boundaries. After that, the region integrating unit 177 selects the smaller of the regions positioned adjacent to each other while each of the selected dividing lines is interposed therebetween and integrates the selected region with the region being the integration target.

After that, as the process at step c5, the region integrating unit 177 judges whether there is any base point with which none of the dividing lines remains. If there is such a base point, the region integrating unit 177 divides the region resulting from the integration at step c3 back into the two regions (i.e., draws the dividing line again between the regions that were once integrated) so as to correct the regions. The region integrating unit 177 updates the divided image by reflecting the results of the integrations/corrections at steps c3 and c5. To realize this correcting process, the region integrating unit 177 needs to store therein information of the regions prior to the integration performed at step c3.

Subsequently, the integration controller 178 judges whether there are any regions being integration targets. After that, if there are regions being integration targets (step c7: Yes), the process returns to step c1 so that the processes described above are repeated. On the contrary, if there are no regions being integration targets (step c7: No), the regions remaining at this point in time (i.e., the regions to which mutually-different labels are assigned within the divided image at this point in time) are regarded as closed regions, and the process returns to step a11 in FIG. 9. After that, the process proceeds to step a13.

Further, at step a11, the abnormal part detecting unit 18 performs the abnormal part detecting process. For example, the abnormal part detecting unit 18 detects abnormal parts from the inside of each of the closed regions, by sequentially using each of the closed regions as a closed region of interest and detecting abnormal parts in the closed region of interest. More specifically, the reference color estimating unit 181 first estimates a reference color indicating normal biological tissues, based on the pixel values of the closed region of interest within the intraluminal image. Subsequently, based on the reference color estimated for the closed region of interest, the abnormal color part detecting unit 182 detects, as an abnormal color part, a region within the closed region of interest where the color feature data (e.g., the pixel values) represents an outlier, which deviates from the reference color by a predetermined amount or larger.

For example, this process can be realized by performing, on the closed region of interest, top-hat processing or black-hat (may also be called "bottom-hat") processing, both of which are already publicly known and are examples of the morphology process that uses a morphology filter. In this situation, the top-hat processing is a method for detecting an abnormal color part by which the opening process is performed on the pixel values in the intraluminal image, so that a threshold process is performed on the difference values in the pixel values between the obtained image and the original intraluminal image. In contrast, the black-hat processing is a method for detecting an abnormal color part by which the closing process, which is already publicly known, is performed on the pixel values in the intraluminal image, so that a threshold process is performed on the difference values in the pixel values between the obtained image and the original intraluminal image. At step a11, the abnormal color part is detected from the inside of each of the closed regions by performing the top-hat processing or the black-hat processing on each of the closed regions, so that the detected abnormal color part is regarded as an abnormal part representing a lesion or the like.

As for a processing procedure, for each of the closed regions, a reference color is first estimated by individually performing a three-dimensional morphology process (grayscale morphology) while using a sphere-shaped structure element having a predetermined size. Subsequently, for each of the closed regions, difference values are calculated between each of the pixel values on the inside and the reference color estimated for the corresponding closed region. After that, a threshold process is performed on the calculated difference values, so that the pixels of which the difference value is equal to or larger than a predetermined threshold are detected as the pixels in the abnormal color part. The result of the abnormal part detecting process performed at step a11 in this manner is output to the display unit 13, so as to be presented to the user who is a medical doctor or the like, while, for example, the abnormal part region is displayed within the intraluminal image, while being distinguishable from the other regions.

As explained above, in the first embodiment, the gradient strength is calculated for each of the pixels, so that the edge lines are detected based on the gradient strengths of the pixels. Also, the end points and the curving points of the edge lines are detected as the base points, so that the intraluminal image is divided into the plurality of regions by drawing the dividing lines that pass through the base points and that extend in, for example, the horizontal and the vertical directions. After that, the closed regions are created by integrating the divided regions under the condition where the integrated region does not include, on the inside thereof, any pixel of which the gradient strength is equal to or higher than the predetermined value, and also, the boundary thereof does not curve toward the interior of the integrated region with a curvature equal to or larger than the predetermined value. In this manner, abnormal parts are detected for each of the created closed regions. As explained above, the intraluminal image shows the groove positions and the contour portions formed by the biological tissues. Such a groove position or a contour portion appears in the intraluminal image as a part in which the gradient strength is equal to or higher than the predetermined value or a part in which the contour curves with a curvature of a certain degree. Accordingly, it is possible to create the closed regions that do not include, on the inside or the boundary thereof, any groove positions or any contour portions shown in the intraluminal image. Also, by applying the morphology process to each of the closed regions, it is possible to detect abnormal parts inside the closed regions. With these arrangements, it is possible to detect the abnormal parts from the intraluminal image with a high level of precision, without mistakenly detecting a groove position or a contour portion as an abnormal part.

Second Embodiment

Figure 21:
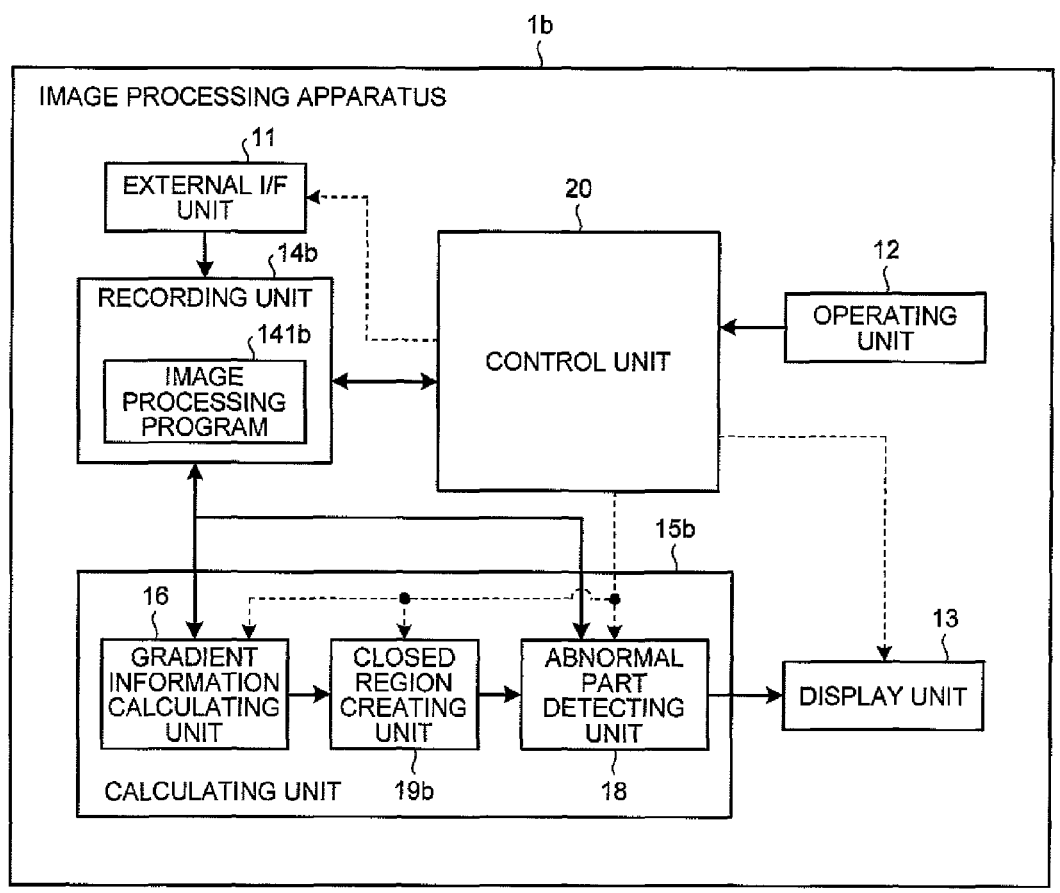
FIG. 21 is a block diagram explaining an exemplary functional configuration of an image processing apparatus according to a second embodiment of the present invention.
Figure 22:
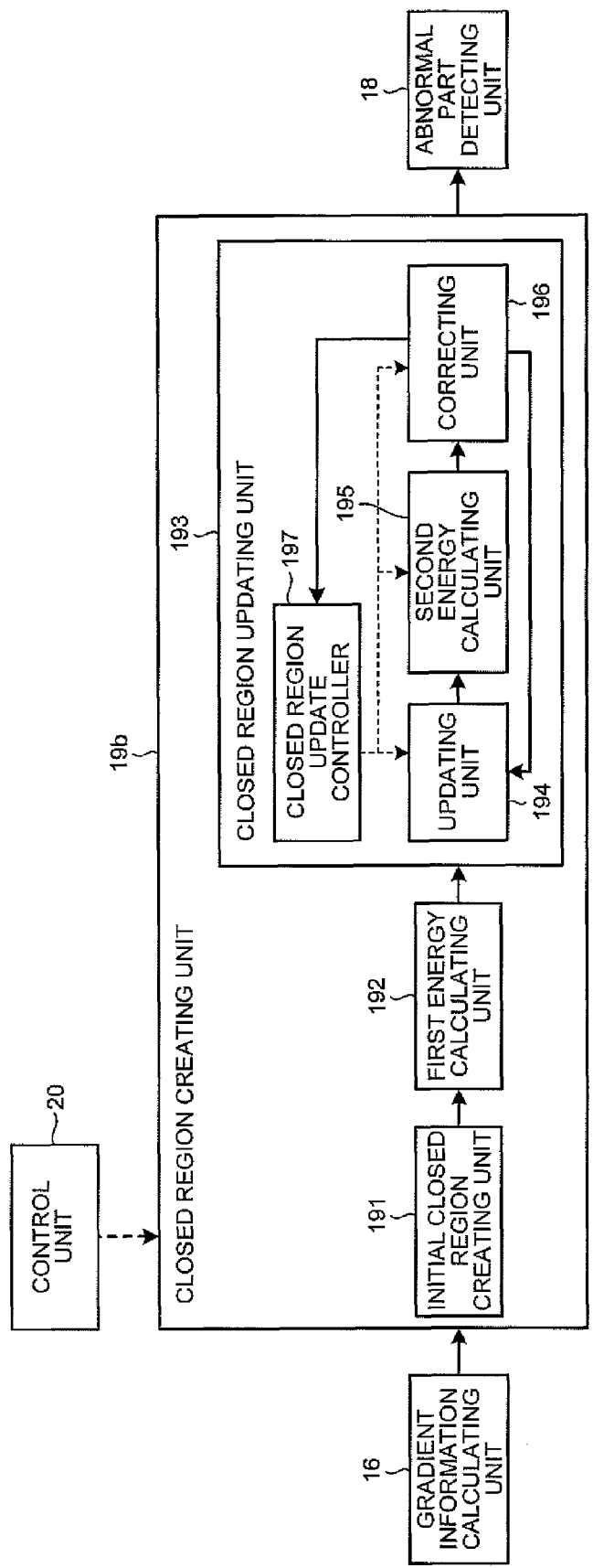
FIG. 22 is a block diagram explaining an exemplary configuration of a closed region creating unit according to the second embodiment.

Next, a second embodiment of the present invention will be explained. FIG. 21 is a block diagram explaining a functional configuration of an image processing apparatus 1b according to the second embodiment. In FIG. 21, some of the configurations that are the same as those in the first embodiment will be referred to by using the same reference symbols. FIG. 22 is a block diagram explaining an exemplary configuration of a closed region creating unit 19b included in a calculating unit 15b. As shown in FIG. 21, the image processing apparatus 1b includes: the external I/F unit 11, the operating unit 12, the display unit 13, a recording unit 14b, the calculating unit 15b, and the control unit 20 that controls an overall operation of the image processing apparatus 1b.

The recording unit 14b records therein an image processing program 141b for detecting an abnormal part from an intraluminal image.

Further, the calculating unit 15b includes the gradient information calculating unit 16, the closed region creating unit 19b, and the abnormal part detecting unit 18. The gradient information calculating unit 16, the closed region creating unit 19b, and the abnormal part detecting unit 18 are connected in the stated order. The image processing apparatus 1b according to the second embodiment is different from the image processing apparatus 1 according to the first embodiment in that the closed region creating unit 19b is included in the calculating unit 15b. In the second embodiment also, the closed region creating unit 19b creates a closed region satisfying the condition where the closed region does not include, on the inside thereof, any pixel of which the gradient strength is equal to or higher than the predetermined value (i.e., the first region condition), and also, the boundary thereof does not curve toward the interior of the closed region with a curvature equal to or larger than the predetermined value (i.e., the second region condition); however, configurations of the closed region creating unit 19b are different from those in the first embodiment. More specifically, as shown in FIG. 22, the closed region creating unit 19b includes an initial closed region creating unit 191, a first energy calculating unit 192, and a closed region updating unit 193. The initial closed region creating unit 191, the first energy calculating unit 192, and the closed region updating unit 193 are connected in the stated order.

Based on the gradient strengths input thereto from the gradient information calculating unit 16, the initial closed region creating unit 191 creates an initial shape of a closed region (i.e., an initial closed region) in a position where the gradient strength is relatively lower than the surrounding thereof. The created initial shape of the closed region is output to the first energy calculating unit 192.

With respect to the initial shape of the closed region input thereto, the first energy calculating unit 192 calculates a first energy by calculating a weighted sum of the following: an internal energy expressing the smoothness of the boundary of the closed region and exhibiting a value where the smoother the boundary of the closed region is, the smaller is the value; an image energy exhibiting a value where the higher the gradient strength at the boundary of the closed region is, the smaller is the value; and an external energy exhibiting a value where the larger the size of the closed region is, the smaller is the value. In the present example, the weighted sum of the internal energy, the image energy, and the external energy is calculated; however, it is not necessary to calculate the weighted sum of the three. It is acceptable to calculate a weighted sum of two out of the three. The calculated first energy is output to the closed region updating unit 193, together with the input initial shape of the closed region.

The closed region updating unit 193 updates the shape of the closed region so as to reduce the first energy. The closed region updating unit 193 includes an updating unit 194, a second energy calculating unit 195, a correcting unit 196, and a closed region update controller 197. The updating unit 194, the second energy calculating unit 195, and the correcting unit 196 are connected in the stated order. The correcting unit 196 is connected to the updating unit 194 and to the closed region update controller 197. Further, a control signal from the closed region update controller 197 is input to the updating unit 194, to the second energy calculating unit 195, and to the correcting unit 196, so that the closed region update controller 197 controls operations of the updating unit 194, the second energy calculating unit 195, and the correcting unit 196.

The updating unit 194 updates the shape of the closed region. More specifically, in a process performed the first time, the updating unit 194 updates the initial shape of the closed region input thereto from the first energy calculating unit 192. Also, the shape of the closed region resulting from an update/correction is input to the updating unit 194 from the correcting unit 196. In a process performed the second time or later, the updating unit 194 updates the shape of the closed region resulting from the update/correction. The updated shape of the closed region is output to the second energy calculating unit 195.

Based on the shape of the closed region input thereto, the second energy calculating unit 195 calculates a second energy by calculating a weighted sum of the following: the internal energy exhibiting a value where the smoother the boundary of the closed region is, the smaller is the value; the image energy exhibiting a value where the higher the gradient strength at the boundary of the closed region is, the smaller is the value; and the external energy exhibiting a value where the larger the size of the closed region is, the smaller is the value. To calculate the second energy also, it is acceptable to calculate a weighted sum of at least two out of the internal energy, the image energy, and the external energy, like in the calculation of the first energy. The calculated second energy is output to the correcting unit 196, together with the input shape of the closed region.

The correcting unit 196 compares the second energy input thereto with the first energy. If the first energy is smaller, the correcting unit 196 corrects the input shape of the closed region back to the shape prior to the update performed by the updating unit 194. On the contrary, if the second energy is smaller, the correcting unit 196 updates the first energy with the second energy. After that, the correcting unit 196 outputs the corrected shape of the closed region to the updating unit 194. Further, if the second energy input thereto is larger than the first energy and the first energy exhibits no change a predetermined number of times, the correcting unit 196 outputs a notification so indicating, to the closed region update controller 197.

The closed region update controller 197 controls the repetition of the processes in which the updating unit updates the shape of the closed region, the second energy calculating unit 195 calculates the second energy, and the correcting unit 196 corrects the shape of the closed region. Further, when receiving an input from the correcting unit 196 notifying that the first energy no longer exhibits any change, the closed region update controller 197 ends the repetition of the processes performed by the updating unit 194, the second energy calculating unit 195, and the correcting unit 196.

As explained above, the closed region creating unit 19b creates the initial shape of the closed region in the region within the intraluminal image where the gradient strength is small and updates/corrects the shape of the closed region so as to reduce the first energy, which is defined by the shape of the closed region. Further, the closed region creating unit 19b outputs information identifying the position of the closed region resulting from the updates/corrections, to the abnormal part detecting unit 18.

FIG. 23 is an overall flowchart of a processing procedure performed by the image processing apparatus 1b according to the second embodiment. The process explained below is realized when the constituent elements of the image processing apparatus 1b operate according to the image processing program 141b recorded in the recording unit 14b. In FIG. 23, some of the processing steps that are the same as those in the first embodiment will be referred to by using the same reference symbols.

As shown in FIG. 23, in the second embodiment, after the R component image obtaining process is performed at step a3, in the gradient information calculating unit 16, the gradient strength calculating unit performs the gradient strength calculating process to calculate the gradient strength of the specific wavelength component image (step d5). For example, like at step b1 in FIG. 11, the Sobel processing is performed on the specific wavelength component image so as to calculate the gradient strength. The method for calculating the gradient strength is not limited to this example. It is acceptable to calculate the gradient strength by using a differential filter other than those for the Sobel processing.

Subsequently, the closed region creating unit 19b performs a closed region creating process to create a closed region by using a dynamic contour method that is already publicly known (step d7). In actuality, the closed region creating process is repeatedly performed so as to create a plurality of closed regions, until closed regions are created in the entire area of the image, for example. FIG. 24 is a flowchart of a detailed processing procedure in the closed region creating process.

As shown in FIG. 24, during the closed region creating process, the initial closed region creating unit 191 first performs an initial closed region creating process to create, based on the gradient strengths, an initial shape of a closed region (i.e., an initial closed region) in an area where the gradient strength is relatively lower than the surrounding thereof (step e1). As explained above, a groove position or a contour portion formed by biological tissues appears in the intraluminal image as a part in which the gradient strength is equal to or higher than a predetermined value. For this reason, the initial closed region creating unit 191 creates the initial shape of the closed region (the initial closed region) in the position where the gradient strength is low, so that such a part is not included.

More specifically, first, a pixel having the lowest gradient strength is selected. Further, the gradient strengths are compared within an area of a predetermined size containing the selected pixel. The initial closed region is created by specifying the area having the low gradient strength and being in the surrounding of the selected pixel. Further, in the closed region creating process performed the second time or later, when the process at step e1 is performed to create an initial closed region, a pixel having the lowest gradient strength is selected from the outside of the already-created closed regions (hereinafter, "the other closed regions"), so that the initial closed region is created so as not to overlap the other closed regions. Alternatively, another arrangement is acceptable in which an initial closed region is first created so as to partially overlap one or more of the other closed regions, and if it is found to be inappropriate to create the initial closed region so as to partially overlap the other closed regions in terms of the energy levels (e.g., if the first energy exceeds the predetermined threshold when the initial closed region is created so as to partially overlap one or more of the other closed regions), then the initial closed region is created so as not to overlap any of the other closed regions. In that situation, the initial closed region is first created so as to partially overlap one or more of the other closed regions. Subsequently, the first energy is calculated for the created initial closed region, in the same manner as at step e3 performed at the subsequent stage. Further, a threshold process is performed on the calculated value of the first energy. If the calculated first energy exceeds the predetermined threshold, the created initial closed region is corrected so as not to overlap any of the other closed regions.

Figure 25:
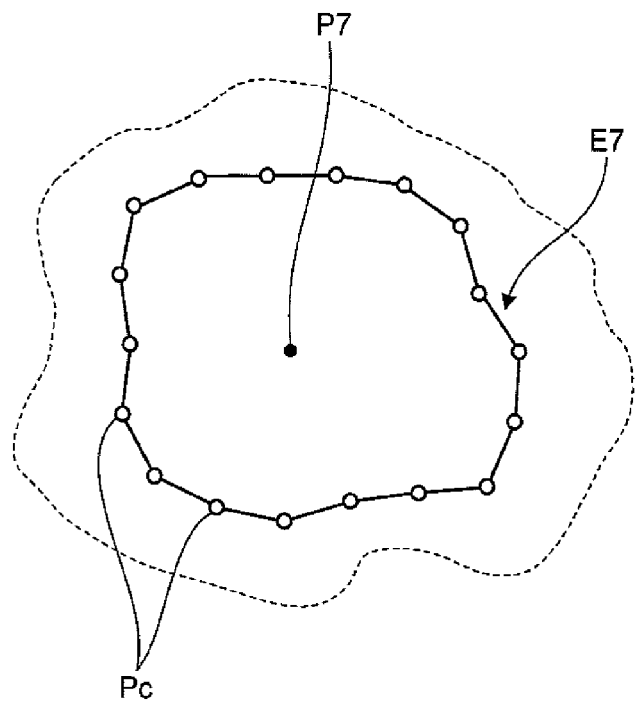
FIG. 25 is a schematic drawing explaining an initial shape of a closed region.

FIG. 25 is a schematic drawing explaining a shape of a closed region. In the second embodiment, as shown in FIG. 25, the initial shape of the closed region (the initial closed region) created at step e1 is defined as a shape obtained by connecting together a plurality of control points Pc positioned on pixels on the boundary of an initial closed region E7. In this situation, all the pixels on the boundary may serve as the control points Pc. Alternatively, the control points Pc may be positioned on the boundary at a predetermined interval, for example. Alternatively, the control points PC may be positioned at intersections obtained by extending lines radially from the center P7. It is acceptable to position the control points PC in any appropriate method. At steps e3 to e9 in FIG. 24, which are processes at subsequent stages, the first energy described above is calculated based on the positions of the control points Pc forming the boundary of the initial closed region E7, the gradient strengths at these positions, and the distances between the center P7 and the control points Pc. Further, the initial closed region E7 is updated/corrected so as to create a closed region, by moving the control points Pc so as to reduce the calculated first energy.

Figure 26:
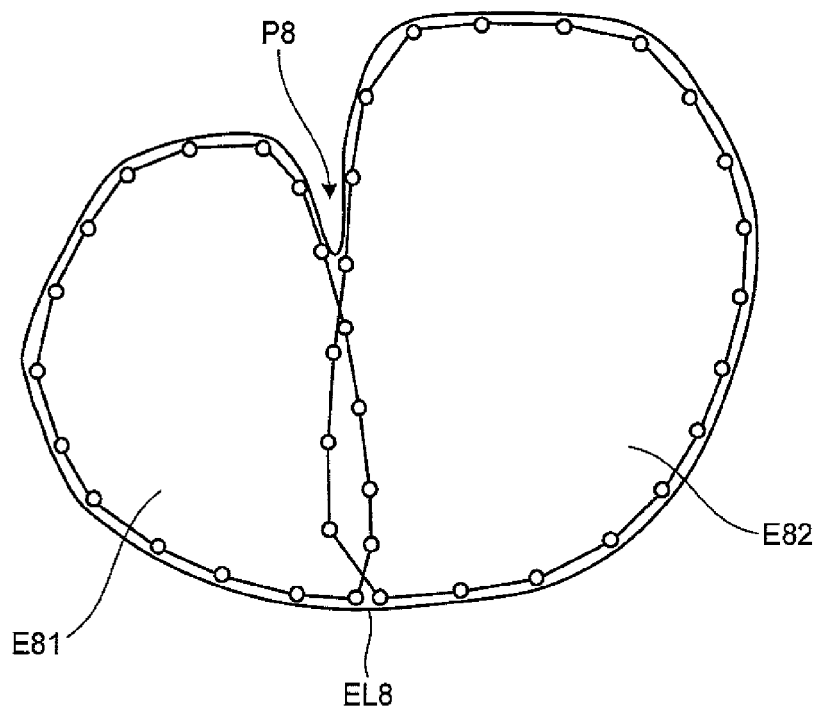
FIG. 26 is a drawing of an example of closed regions.

In the actual process, the closed region creating unit 19b creates the closed region by updating/correcting the initial closed region so as to expand, as explained below. In this situation, the closed region creating unit 19b creates the closed region satisfying the first region condition by ensuring that edges positioned on the outside of the initial closed region do not go into the inside of the closed region, during the process of updating/correcting the initial closed region. Further, the closed region creating unit 19b creates the closed region satisfying the second region condition by ensuring that the boundary of the closed region does not expand along a significantly-curving edge positioned on the outside thereof and does not curve significantly, during the process of updating/correcting the initial closed region. FIG. 26 is a drawing of an example of closed regions. Shown are two closed regions (E81 and E82) that are created on the inside of an edge EL8 including a portion P8 corresponding to a contour portion or the like that curves toward the interior with a curvature larger than the predetermined value. As shown in FIG. 26, each of the closed regions E81 and E82 is created while ensuring that the boundary thereof does not expand along the curving portion P8.

First, at step e3, the first energy calculating unit 192 performs a first energy calculating process to calculate a first energy by calculating a weighted sum of the following, with respect to the initial shape of the closed region (initial closed region): the internal energy exhibiting a value where the smoother the boundary of the closed region is, the smaller is the value; the image energy exhibiting a value where the higher the gradient strength at the boundary of the closed region is, the smaller is the value; and the external energy exhibiting a value where the larger the size of the closed region is, the smaller is the value.

In this situation, as explained above, the initial shape of the closed region is defined as a shape obtained by connecting the plurality of control points together. The first energy is calculated as a total of weighted sums of the three energies (i.e., the internal energy, the image energy, and the external energy) at the control points.

The calculation can be expressed by using Expression (5) below.

$$E_1 = \int_1^N (E_{internal}(i) + E_{image}(i) + E_{external}(i)) di \quad (5)$$

In Expression (5), N denotes the number of control points. $E_{internal}$ denotes the internal energy, and $E_{image}$ denotes the image energy, while $E_{external}$ denotes the external energy. In the following sections, these energies will be explained.

The internal energy $E_{internal}$ is an energy that limits a control point of interest $v_2$ so that the control point $v_2$ does not curve toward the interior of the closed region with respect to the positions of adjacent control points $v_1$, with a curvature larger than a predetermined value, and $v_3$. The internal energy $E_{internal}$ is calculated as a value that becomes small when the second region condition is satisfied. For example, the internal energy $E_{internal}$ can be calculated by using Expressions (6) and (7) shown below, based on an outer product of vectors $x_a$ and $x_b$ between the three control points $v_1$, $v_2$, and $v_3$.

$$\text{If } (x_a y_b - x_b y_a) > 0 \text{ is satisfied, } E_{internal}(i) = 0 \quad (6)$$

$$\text{Otherwise, } E_{internal}(i) = \alpha |x_a y_b - x_b y_a| \quad (7)$$

where $(x_a, y_a) = (x_2 - x_1, y_2 - y_1)$;

$(x_b, y_b) = (x_3 - x_2, y_3 - y_2)$;

$v_1 = (x_1, x_1)$;

$v_2 = (x_2, x_2)$; and $v_3 = (x_3, x_3)$.

The image energy $E_{image}$ is an energy inversely proportional to the gradient strength of the pixel in the position of a control point of interest. The image energy $E_{image}$ can be expressed by Expression (8) shown below and is calculated as a value that becomes small when the first region condition is satisfied.

$$E_{image}(i) = \beta \frac{1}{\nabla S_{(i)}} \quad (8)$$

where $\nabla S_{(i)}$ is a value of the gradient strength at the coordinates of a control point (i).

The external energy $E_{external}$ is an energy received in a direction in which the closed region expands, by a control point of interest. The external energy $E_{external}$ can be calculated by using Expression (9) shown below, in which the value of the external energy $E_{external}$ is inversely proportional to the distance between the center of the closed region and the control point of interest.

$$E_{external}(i) = \gamma \frac{1}{1_i} \quad (9)$$

where $$1_i = \sqrt{(x_i - x_c)^2 + (y_i - y_c)^2}$$

$$(x_c, y_c) = \left( \frac{\sum_{i=1}^{N} x_i}{N}, \frac{\sum_{i=1}^{N} y_i}{N} \right)$$

Further, "α" in Expression (7), "β" in Expression (8), and "γ" in Expression (9) are weight coefficients for the corresponding energy, and the values thereof are determined by an empirical rule.

After that, as shown in FIG. 24, the updating unit 194 performs a control point position updating process to update the shape of the closed region (step e5). According to the external energy shown in Expression (6) above, the energy becomes smaller when the shape of the closed region is updated so as to expand (i.e., when the positions of the control points are moved in such directions that expand the closed region). Thus, the shape of the closed region is updated by moving the control points while prioritizing, among the eight surrounding directions, the directions toward the outside of the closed region. For instance, in the example shown in FIG. 25, the positions of the control points Pc are moved toward the outside of the boundary of the initial closed region E7, so that the shape thereof is updated so as to expand, as shown with the broken line in FIG. 25. The distances by which the control points are moved are determined by, for example, generating a random number, or the like.

Subsequently, the second energy calculating unit 195 performs a second energy calculating process to calculate the second energy by calculating a weighted sum of the following, with respect to the updated closed region: the internal energy exhibiting a value where the smoother the boundary of the closed region is, the smaller is the value; the image energy exhibiting a value where the higher the gradient strength at the boundary of the closed region is, the smaller is the value; and the external energy exhibiting a value where the larger the size of the closed region is, the smaller is the value (step e7). More specifically, the second energy calculating unit 195 performs the same process as at step e3 on the updated closed region, so as to calculate the second energy by calculating a total of the weighted sums of the three energies (i.e., the internal energy, the image energy, and the external energy) at the control points.

Subsequently, the correcting unit 196 performs an update correcting process (step e9). More specifically, the correcting unit 196 compares the first energy with the second energy. If the first energy is smaller, the correcting unit 196 corrects the shape of the closed region back to the shape prior to the update. On the contrary, if the second energy is smaller, the correcting unit 196 updates the first energy with the second energy. To realize the update correcting process, the correcting unit 196 needs to store therein the shape of the closed region prior to the update performed at step e5 (i.e., the shape of the closed region output to the updating unit 194 after being updated/corrected at step e9 last time). If the first energy is smaller than the second energy when the process at step e9 is performed first time, the shape of the closed region is corrected back to the initial shape.

After that, the closed region update controller 197 performs a judging process to judge whether the repetition should be ended, based on whether the first energy no longer exhibits changes (step e11). After that, as long as the second energy is equal to or smaller than the first energy, or as long as the second energy is larger than the first energy, but the number of times the first energy exhibits no change is smaller than the predetermined value, the closed region update controller 197 judges that the repetition should not be ended. Thus, the process returns to step e5, so that the processes described above are repeated. On the contrary, if the second energy is larger than the first energy, and the first energy keeps exhibiting no change the predetermined number of times, the closed region update controller 197 judges that the repetition should be ended and thus ends the closed region creating process. After that, the process returns to step d7 in FIG. 23, before proceeding to step a13.

As explained above, in the second embodiment, the shape of the initial closed region is created based on the gradient strengths of the pixels. Further, the three energies (i.e., the internal energy, the image energy, and the external energy) are calculated based on the boundary of the closed region (i.e., the positions of the control points Pc shown in FIG. 25), the gradient strengths on the boundary of the closed region, and the distances between the center of the closed region and the boundary of the closed region, so that the total of the weighted sums are calculated as the first energy. After that, the closed region satisfying the first and the second region conditions, by moving the positions of the control points Pc and updating the shape of the closed region so as to reduce the first energy. Accordingly, it is possible to create the closed region that does not include, on the inside and on the boundary thereof, groove positions and contour portions shown in the intraluminal image. With these arrangements, it is possible to achieve the same advantageous effects as in the first embodiment. It is possible to detect abnormal parts from the intraluminal image with a high level of precision, without mistakenly detecting a groove position or a contour portion as an abnormal part.

It is possible to realize the image processing apparatus 1 according to the first embodiment and the image processing apparatus 1*b* according to the second embodiment by executing a program prepared in advance, in a computer system such as a personal computer, a work station, or the like. In the following sections, a computer system that has the same functions as those of the image processing apparatuses 1 and 1*b* explained in the first and the second embodiments and that executes the image processing programs 141 and 141*b* will be explained.

Figure 27:
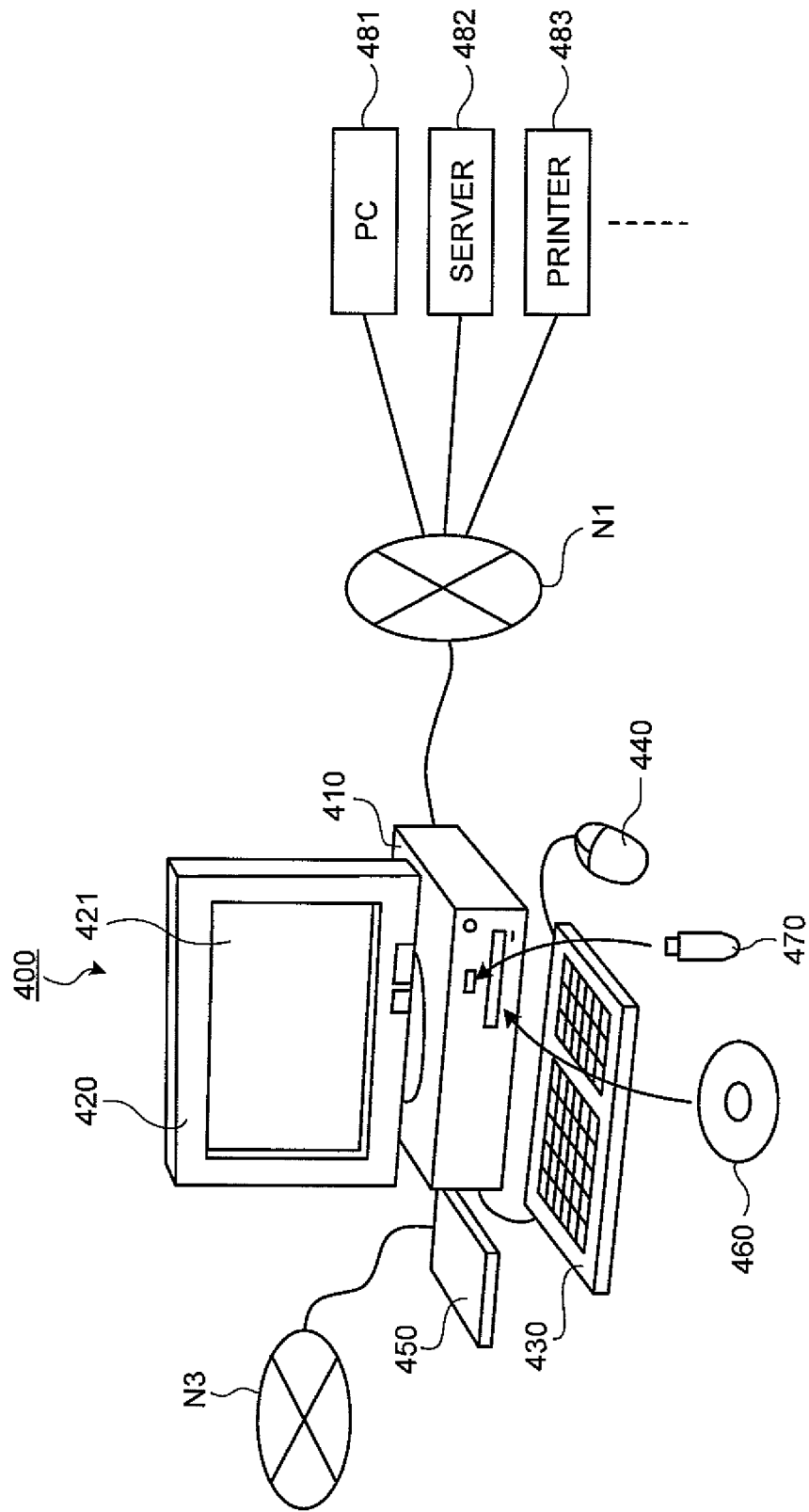
FIG. 27 is a system configuration diagram depicting a configuration of a computer system to which an aspect of the present invention is applied.
Figure 28:
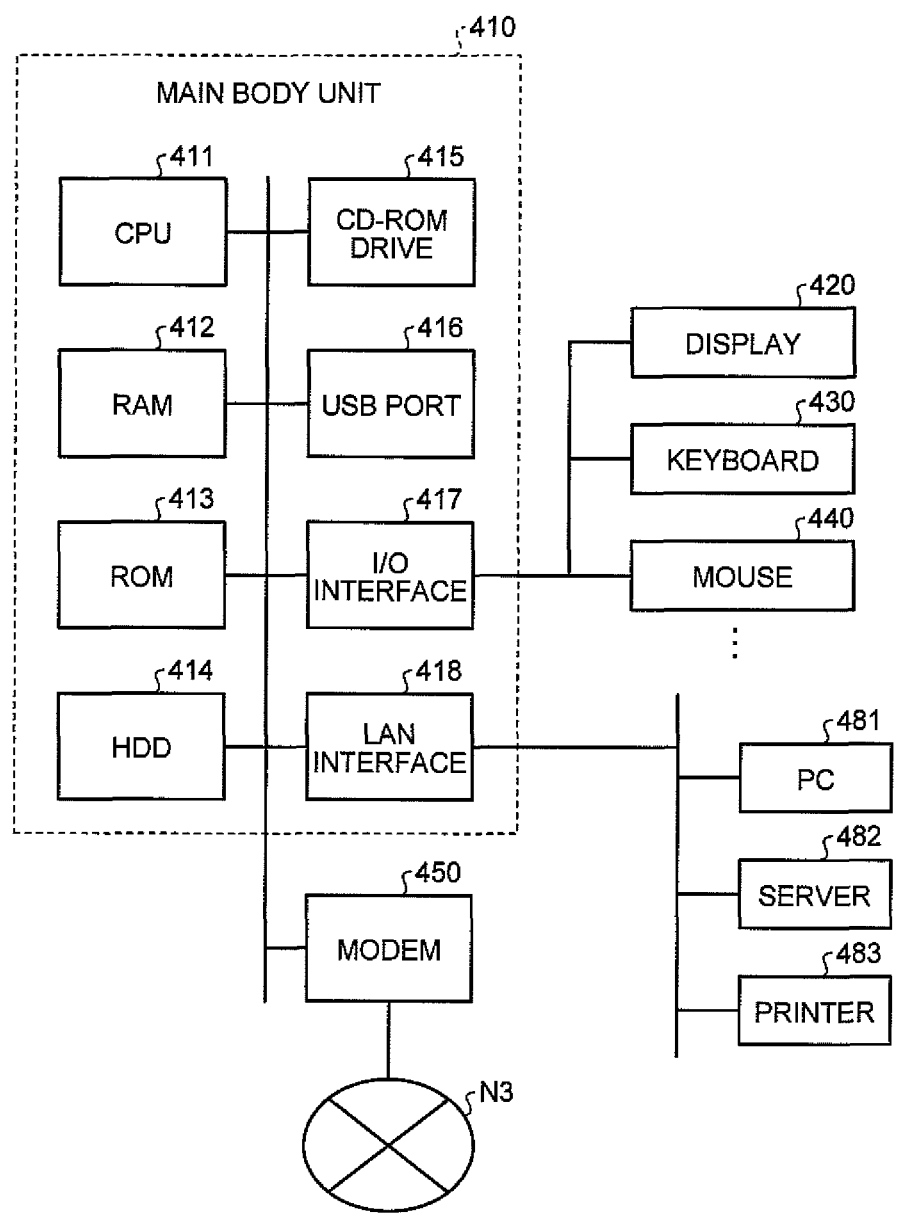
FIG. 28 is a block diagram of a main body unit included in the computer system shown in FIG. 27.

FIG. 27 is a system configuration diagram depicting a configuration of a computer system 400 according to the present modification example. FIG. 28 is a block diagram of a main body unit 410 included in the computer system 400. As shown in FIG. 27, the computer system 400 includes the main body unit 410, a display 420 for displaying information such as images on a display screen 421 according to an instruction from the main body unit 410; a keyboard 430 for inputting various types of information to the computer system 400; and a mouse 440 for specifying an arbitrary position on the display screen 421 of the display 420.

As shown in FIGS. 27 and 28, the main body unit 410 included in the computer system 400 includes: a CPU 411; a RAM 412; a ROM 413; a Hard Disk Drive (HDD) 414; a CD-ROM drive 415 that accepts a CD-ROM 460; a Universal Serial Bus (USB) port 416 to which a USB memory 470 can be detachably connected; an Input/Output (I/O) interface 417 to which the display 420, the keyboard 430, and the mouse 440 are connected; and a Local Area Network (LAN) interface 418 for establishing a connection to a local area network or a wide area network (LAN/WAN) N1.

Further, a modem 450 for establishing a connection to a public line N3 such as the Internet is connected to the computer system 400. Also, via the LAN interface 418 and the local area network/wide area network N1, other computer systems such as a personal computer (PC) 481, a server 482, a printer 483, and the like are connected to the computer system 400.

Further, the computer system 400 realizes an image processing apparatus (e.g., the image processing apparatus 1 according to the first embodiment or the image processing apparatus 1*b* according to the second embodiment) by reading and executing an image processing program recorded on a predetermined recording medium (e.g., the image processing program 141 according to the first embodiment or the image processing program 141*b* according to the second embodiment). In this situation, the predetermined recording medium may be any recording medium having recorded thereon the image processing program readable by the computer system 400, and the examples include: a "portable physical medium" such as the CD-ROM 460 or the USB memory 470, as well as a Magneto-Optical (MO) disk, a Digital Versatile Disk (DVD), a Flexible Disk (FD), an optical magnetic disk, or an Integrated Circuit (IC) card; a "fixed physical medium" such as the HDD 414, the RAM 412, or the ROM 413 provided on the inside or the outside of the computer system 400; and a "communication medium" that stores therein a program for a short period of time when the program is transmitted, such as the public line N3 connected via the modem 450, or the local area network/wide area network N1 to which other computer systems such as PC 481 and the server 482 are connected.

In other words, the image processing program is recorded in a computer-readable manner on the recording medium such as the "portable physical medium", the "fixed physical medium", the "communication medium", or the like. The computer system 400 realizes the image processing apparatus by reading and executing the image processing program from such a recording medium. The image processing program does not necessarily have to be executed by the computer system 400. It is possible to apply the present invention to a situation where any of the other computer systems such as the PC 481 or the server 482 executes the image processing program or where any of the other computer systems execute the image processing program in collaboration with one another.

Further, the present invention is not limited to the first and the second embodiments and the modification examples described above. It is possible to form various inventions by combining, as appropriate, two or more of the constituent elements disclosed in the exemplary embodiments and the modification examples. For example, it is acceptable to form an invention by omitting one or more of the constituent elements disclosed in the exemplary embodiments and the modification examples. Alternatively, it is acceptable to form an invention by combining, as appropriate, two or more of the constituent elements disclosed in mutually-different exemplary embodiments and/or modification examples.

According to an aspect of the present invention described above, it is possible to detect abnormal parts, if any, from the intraluminal image with a high level of precision.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus that detects an abnormal part from an intraluminal image, the apparatus comprising:
   a processor; and
   a memory storing computer-readable instructions that, when executed by the processor, implement:
   a gradient information calculating unit that calculates gradient information of each of pixels, based on pixel values of the intraluminal image;
   a closed region creating unit that, based on the gradient information, creates a closed region so that the closed region has a boundary with pixels with positions satisfying a condition where the closed region does not include, on an inside thereof, any pixel of which a gradient strength is equal to or higher than a predetermined value, and also, a boundary of the closed region does not curve toward an interior of the closed region, with a curvature equal to or larger than a predetermined value; and
   an abnormal part detecting unit that detects the abnormal part from the inside of the closed region.

2. The image processing apparatus according to claim 1, wherein
   the intraluminal image includes a plurality of wavelength components,
   the gradient information calculating unit includes:
      a specific wavelength image extracting unit that extracts, from the intraluminal image, an image corresponding to a specific wavelength component specified depending on a degree of absorption or dispersion within a living body; and
      a gradient strength calculating unit that calculates gradient strengths of the pixel values of the pixels, based on the image corresponding to the specific wavelength component, and
   the gradient strengths are the gradient information.

3. The image processing apparatus according to claim 1, wherein the closed region creating unit includes:
   a dividing unit that divides the intraluminal image into a plurality of regions, based on the gradient information; and
   an integrating unit that, based on feature data of each of the regions, integrates two or more of the regions under a condition where a boundary of a region resulting from the integration does not curve toward an interior of the region, with a curvature equal to or larger than a predetermined value, and the region resulting from the integration performed by the integrating unit is the closed region.

4. The image processing apparatus according to claim 3, wherein the dividing unit includes:
   a line edge detecting unit that detects a line edge, based on the gradient information;
   a base point detecting unit that detects an end point of the line edge and a curving point at which the line edge curves with a curvature equal to or larger than a predetermined value and uses the end point and the curving point as base points of a dividing line; and
   a dividing line creating unit that draws dividing lines from each of the base points into two mutually-different directions, until each of the dividing lines meets a line edge or a rim of an image, and
   each of regions defined by the line edges and the dividing lines is a different one of the plurality of regions.

5. The image processing apparatus according to claim 3, wherein the integrating unit includes:
   a region information calculating unit that calculates, as the feature data of each of the regions, region information including a shape feature data of the region and a length of a boundary between the region and another region positioned adjacent thereto;
   a region integrating unit that selects the two or more regions being integration targets based on the region information and integrates the selected regions; and
   an integration controller that controls a repetition of processes performed by the region information calculating unit and the region integrating unit and ends the repetition when there are no longer any regions being the integration targets.

6. The image processing apparatus according to claim 1, wherein the closed region creating unit includes:
   an initial closed region creating unit that creates an initial shape of the closed region, based on the gradient information;
   a first energy calculating unit that calculates, as a first energy, a weighted sum of at least two selected out of: an internal energy exhibiting a value where the smoother the boundary of the closed region is, the smaller is the value; an image energy exhibiting a value where the higher the gradient strength at the boundary of the closed region is, the smaller is the value; and an external energy exhibiting a value where the larger a size of the closed region is, the smaller is the value; and
   a closed region updating unit that, while using the initial shape of the closed region as a reference, updates a shape of the closed region so as to reduce the first energy.

7. The image processing apparatus according to claim 6, wherein the initial closed region creating unit creates the initial shape of the closed region in a position where the gradient strength is relatively lower than a surrounding thereof.

8. The image processing apparatus according to claim 7, wherein the initial closed region creating unit creates the initial shape of the closed region so that the closed region does not overlap any other closed regions.

9. The image processing apparatus according to claim 7, wherein the initial closed region creating unit creates the initial shape of the closed region so that the closed region partially overlaps another closed region and, as a result of calculating the first energy with respect to the created closed region, if the calculated first energy exceeds a predetermined value, the initial closed region creating unit corrects the initial shape of the closed region so that the created closed region does not overlap said another closed region.

10. The image processing apparatus according to claim 6, wherein the closed region updating unit includes:
an updating unit that updates the shape of the closed region;
a second energy calculating unit that calculates, as a second energy, a weighted sum of at least two selected out of the following, with respect to the updated closed region: an internal energy exhibiting a value where the smoother a boundary of the updated closed region is, the smaller is the value; an image energy exhibiting a value where the higher the gradient strength at the boundary of the updated closed region is, the smaller is the value; and an external energy exhibiting a value where the larger a size of the updated closed region is, the smaller is the value;
a correcting unit that compares the first energy with the second energy, corrects the shape of the updated closed region back to the shape of the closed region prior to the update if the first energy is smaller, and updates the first energy with the second energy if the second energy is smaller; and
a closed region update controller that controls a repetition of processes performed by the updating unit, the second energy calculating unit, and the correcting unit and ends the repetition when the first energy no longer exhibits any change.

11. The image processing apparatus according to claim 1, wherein the abnormal part detecting unit includes:
a reference color estimating unit that estimates a reference color indicating a normal biological tissue, for each of the closed regions; and
an abnormal color part detecting unit that detects, for each of the closed regions, a region having color feature data deviating from the reference color by a predetermined amount or larger, as an abnormal color part, and
the abnormal color part is the abnormal part.

12. The image processing apparatus according to claim 11, wherein the reference color estimating unit estimates the reference color by using a morphology filter.

13. The image processing apparatus according to claim 9, wherein the abnormal color part detecting unit detects the abnormal color part, based on a difference value between a pixel value on the inside of the closed region and the reference color.

14. An image processing method for detecting an abnormal part from an intraluminal image, the method comprising:
calculating gradient information of each of pixels, based on pixel values of the intraluminal image;
creating, based on the gradient information, a closed region so that the closed region has a boundary with pixels with positions satisfying a condition where the closed region does not include, on an inside thereof, any pixel of which a gradient strength is equal to or higher than a predetermined value, and also, a boundary of the closed region does not curve toward an interior of the closed region with a curvature equal to or larger than a predetermined value; and
detecting the abnormal part from the inside of the closed region.

15. A non-transitory computer-readable recording medium with an executable program stored thereon, wherein the program instructs a processor to perform:
calculating gradient information of each of pixels, based on pixel values of the intraluminal image;
creating, based on the gradient information, a closed region so that the closed region has a boundary with pixels with positions satisfying a condition where the closed region does not include, on an inside thereof, any pixel of which a gradient strength is equal to or higher than a predetermined value, and also, a boundary of the closed region does not curve toward an interior of the closed region with a curvature equal to or larger than a predetermined value; and
detecting the abnormal part from the inside of the closed region.

16. An image processing apparatus that detects an abnormal part from an intraluminal image, the apparatus comprising:
a gradient information calculating unit that calculates gradient information of each of pixels, based on pixel values of the intraluminal image;
a closed region creating unit that, based on the gradient information, creates a closed region so that the closed region has a boundary with pixels with positions satisfying a condition where the closed region does not include, on an inside thereof, any pixel of which a gradient strength is equal to or higher than a predetermined value, and also, a boundary of the closed region does not curve toward an interior of the closed region, with a curvature equal to or larger than a predetermined value; and
an abnormal part detecting unit that detects the abnormal part from the inside of the closed region.

* * * * *